(12) United States Patent
Ono et al.

(10) Patent No.: US 9,752,636 B2
(45) Date of Patent: Sep. 5, 2017

(54) HELICAL COMPRESSION SPRING AND METHOD FOR MANUFACTURING SAME

(71) Applicant: NHK SPRING CO., LTD., Yokohama-shi, Kanagawa (JP)

(72) Inventors: Yuitirou Ono, Fussa (JP); Tohru Shiraishi, Yokohama (JP); Yoshiki Ono, Yokohama (JP); Keita Takahashi, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 14/427,106

(22) PCT Filed: Sep. 5, 2013

(86) PCT No.: PCT/JP2013/073937
§ 371 (c)(1),
(2) Date: Mar. 10, 2015

(87) PCT Pub. No.: WO2014/042066
PCT Pub. Date: Mar. 20, 2014

(65) Prior Publication Data
US 2015/0252863 A1    Sep. 10, 2015

(30) Foreign Application Priority Data

Sep. 14, 2012  (JP) .................... 2012-202416

(51) Int. Cl.
*F16F 1/02* (2006.01)
*B21F 3/02* (2006.01)
(Continued)

(52) U.S. Cl.
CPC ............... *F16F 1/021* (2013.01); *B21F 3/02* (2013.01); *B21F 35/00* (2013.01); *B24C 1/10* (2013.01);
(Continued)

(58) Field of Classification Search
CPC .. F16F 1/06; F16F 2224/0216; F16F 2226/00; F16F 2236/04; B21F 3/02;
(Continued)

(56) References Cited

U.S. PATENT DOCUMENTS 6,017,641 A * 1/2000 Aoki .................. C21D 1/18
148/208
6,338,763 B1   1/2002 Hashimura et al.
(Continued)

FOREIGN PATENT DOCUMENTS

CN    1768155 A    5/2006
EP    2 743 366 A1    6/2014
(Continued)

OTHER PUBLICATIONS

English Translation of Fujiwara et al. (JP 2012-077367).*
(Continued)

*Primary Examiner* — Thomas Irvin
(74) *Attorney, Agent, or Firm* — Oliff PLC (57) ABSTRACT

The coil spring includes steel wire material containing 0.45 to 0.80 weight % of C, 0.15 to 2.50 weight % of Si, 0.3 to 1.0 weight % of Mn and iron and inevitable impurities as the remainder, and having a circle equivalent diameter of 2.5 mm to 10 mm, in which internal hardness at a freely selected cross section of the wire material is in a range of 570 to 700 Hv, C-condensed layer which exceeds average concentration of C contained in the steel wire material exists at surface layer part, and in an approximate maximum principal stress direction generated when a compressive load is loaded on spring of inner diameter side of the coil spring of the wire material, unloaded compressive residual stress at a depth of 0.2 mm and 0.4 min from surface of the wire material is not less than 200 MPa and not less than 60 MPa, respectively.

45 Claims, 3 Drawing Sheets

(51) Int. Cl.
| | |
|---|---|
| *B21F 35/00* | (2006.01) |
| *C21D 7/06* | (2006.01) |
| *C21D 9/02* | (2006.01) |
| *C23C 8/22* | (2006.01) |
| *C23C 8/80* | (2006.01) |
| *C21D 1/06* | (2006.01) |
| *C22C 38/04* | (2006.01) |
| *C22C 38/02* | (2006.01) |
| *C22C 38/08* | (2006.01) |
| *C22C 38/12* | (2006.01) |
| *C22C 38/18* | (2006.01) |
| *B24C 1/10* | (2006.01) |
| *C21D 6/00* | (2006.01) |
| *C21D 8/06* | (2006.01) |
| *C22C 38/22* | (2006.01) |
| *C22C 38/24* | (2006.01) |
| *C22C 38/34* | (2006.01) |
| *C22C 38/46* | (2006.01) |
| *C23C 8/02* | (2006.01) |
| *F16F 1/06* | (2006.01) |

(52) U.S. Cl.
CPC ............... *C21D 1/06* (2013.01); *C21D 6/002* (2013.01); *C21D 6/004* (2013.01); *C21D 6/005* (2013.01); *C21D 6/008* (2013.01); *C21D 7/06* (2013.01); *C21D 8/065* (2013.01); *C21D 9/02* (2013.01); *C22C 38/02* (2013.01); *C22C 38/04* (2013.01); *C22C 38/08* (2013.01); *C22C 38/12* (2013.01); *C22C 38/18* (2013.01); *C22C 38/22* (2013.01); *C22C 38/24* (2013.01); *C22C 38/34* (2013.01); *C22C 38/46* (2013.01); *C23C 8/02* (2013.01); *C23C 8/22* (2013.01); *C23C 8/80* (2013.01); *F16F 1/06* (2013.01); *F16F 2224/0216* (2013.01); *F16F 2226/00* (2013.01); *F16F 2236/04* (2013.01); *F16F 2238/026* (2013.01)

(58) Field of Classification Search
CPC ........... B21F 35/00; C21D 7/06; C21D 6/008; C21D 6/005; C21D 9/02; C21D 6/004; C21D 6/002; C22C 38/04; C22C 38/02
USPC .................................. 267/166, 81, 286, 289
See application file for complete search history.

(56) References Cited

U.S. PATENT DOCUMENTS

| | | | | |
|---|---|---|---|---|
| 8,308,150 B2* | 11/2012 | Tange | ...................... | C21D 7/06 267/166 |
| 8,741,216 B2* | 6/2014 | Sugimoto | ................ | C21D 1/25 148/330 |
| 9,080,233 B2* | 7/2015 | Suzuki | ..................... | C21D 9/02 |
| 9,341,223 B2* | 5/2016 | Suzuki | ..................... | C21D 7/06 |
| 2014/0306389 A1 | 10/2014 | Ikai et al. | | |
| 2016/0151832 A1* | 6/2016 | Miyazaki | .............. | C22C 38/001 148/548 |

FOREIGN PATENT DOCUMENTS

| | | |
|---|---|---|
| JP | S56-152921 | 11/1981 |
| JP | H01-177318 A | 7/1989 |
| JP | H04-099126 A | 3/1992 |
| JP | H05-086418 A | 4/1993 |
| JP | 2000-326036 A | 11/2000 |
| JP | 2001-082518 A | 3/2001 |
| JP | 3595901 B2 | 12/2004 |
| JP | 2008-045178 A | 2/2008 |
| JP | 2009-226523 A | 10/2009 |
| JP | 2012-077367 A | 4/2012 |
| WO | 2004/087978 A1 | 10/2004 |

OTHER PUBLICATIONS

Feb. 2, 2016 Office Action issued in Chinese Patent Application No. 201380047783.2.
Daxian "An Analytical Probing of the New Technology for the Heat Treatment of Springs", Materials for Mechanical Engineering, vol. 20, No. 2, 1996, pp. 41-43 and 54.
Dec. 10, 2013 International Search Report issued in International Application No. PCT/JP2013/073937.
Mar. 31, 2016 Supplementary Search Report issued in European Patent Application No. 13837663.7.

* cited by examiner

HELICAL COMPRESSION SPRING AND METHOD FOR MANUFACTURING SAME

TECHNICAL FIELD

The present invention relates to a compression coil spring used in engine or clutch of vehicles for example, and in particular, relates to a compression coil spring having superior fatigue resistance even under use environment of high stress and a method for manufacturing the same.

BACKGROUND ART

Recently, in view of the environmental problems, requirements for lower fuel consumption for vehicle have been severer year by year, and size and weight reduction for vehicle parts is strongly required than before. With respect to this requirements for size and weight reduction, for example, researches are performed so much on high-strengthening of material and surface strengthening by surface treatment in a field of compression coil spring parts such as a clutch damper spring used in clutch or a valve spring used in engine, and as a result, fatigue resistance and settling resistance which are important as a property of coil spring have been improved.

Figure 1A:
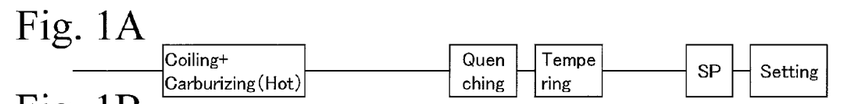
FIG. 1 is a diagram showing an example of the method for production of coil spring.
Figure 1B:
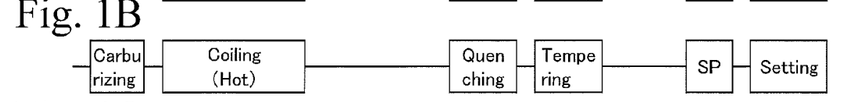

Generally, a method for production of coil spring is roughly classified in a hot forming method and a cold forming method. The hot forming method is employed in forming coil spring in which cold forming is difficult due to its low workability, such as a coil having large wire diameter d, and having small spring index D/d which is a ratio of coil average diameter D and the wire diameter d. As such a coil spring material, carbon steel and spring steel are mentioned. In the hot forming method, as shown in FIG. 1F, wire material is heated to high temperature so as to be processed easily, wound around core metal so as to perform coiling in a coil spring shape, quenched, tempered, and further processed by shotpeening or setting, so as to obtain fatigue resistance and settling resistance which are important as a property of coil spring. It should be noted that in the hot forming process, coiling without using core metal is not practically realized since it is technically very difficult. Therefore, in a conventional technique, core metal is necessary in hot forming method, and a coil spring which can be produced in the method has lower degree of freedom in shape compared to a coil produced by the cold forming method in which coiling can be performed without using core metal.

On the other hand, with respect to compression coil spring of valve spring or clutch damper spring class, the cold forming can be employed because they have comparatively small wire diameter. In addition, high dimension accuracy is easily obtained since there is no transformation or thermal expansion and shrinkage by heating. In addition, since mass production property (takt time, cost) by processing rate and facility cost is superior, compression coil spring in this class has been conventionally produced by the cold forming method. Furthermore, the cold forming method is employed mainly because forming technique without core metal is established in this cold forming method, and shape freedom degree of coil spring is high. A production technique of a compression coil spring of valve spring or clutch damper spring class by a hot forming method does not exist ever before. It should be noted that a hard drawn wire such as carbon steel wire, hard steel wire, piano wire and spring steel wire has been conventionally used as a coil spring wire material in the cold forming method. However, recently, from the viewpoint of weight reduction, high strengthening of material is required, and an expensive oil tempered wire is widely spreading.

Figures 1C, 1D:
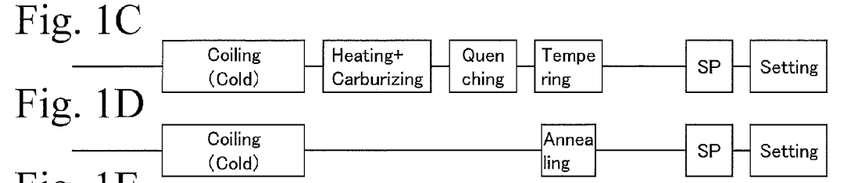
Figure 1E:
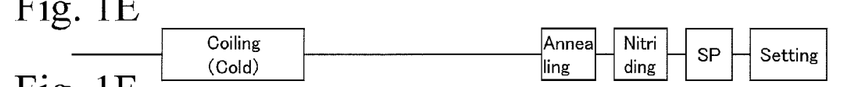
Figure 1F:
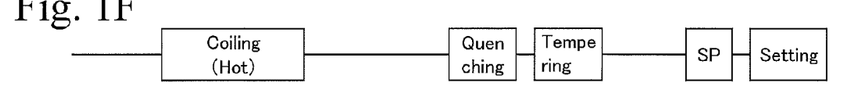

In the cold forming method, as shown in FIGS. 1D and 1E, wire material is coiled in a coil spring shape in cold condition, annealed, and further processed by shotpeening and setting if necessary. Here, annealing has a purpose for removing residual stress which is generated by processing and which is obstructive factor for improving fatigue resistance of coil spring, and it may contribute for improving fatigue resistance of coil spring together with imparting of compressive residual stress onto surface by shotpeening. It should be noted that with respect to a coil spring used in heavy load stress such as valve spring or clutch damper spring, surface hardening treatment by nitriding treatment is performed if necessary before shotpeening.

Researches are performed so much on further improvement in fatigue resistance. For example, Japanese Patent No. 3595901 discloses an oil tempered wire for a cold forming, and a technique in which fatigue resistance is improved by using processing-induced transformation of residual austenite. Japanese Unexamined Patent Application Publication No. 2009-226523 discloses a technique in which multi-step shotpeening at different projection rates is performed onto surface of wire material on which nitriding treatment is performed so that large compressive residual stress is imparted and fatigue resistance is improved.

In the U.S. Pat. No. 3,595,901, residual stress may be generated in the coil spring after coiling. This residual stress, in particular tensile residual stress along wire axis direction generated on the surface of coil inner diameter side, is an obstructive factor for improving fatigue resistance as a coil spring. Ordinarily, annealing is performed so as to remove this residual stress by processing; however, it is easily estimated and is widely known for those in the art that it is difficult to completely remove this residual stress while maintaining desired wire material strength, even if the wire material having high tempering softening resistance disclosed in the U.S. Pat. No. 3,595,901 is used. Therefore, even if shotpeening is performed thereafter, it is difficult to impart sufficient compressive residual stress onto wire material surface due to influence of tensile residual stress by processing remained in coil inner diameter side, and sufficient fatigue resistance as a coil spring cannot be obtained. Furthermore, an element such as V or Mo which contributes for improving tempering softening resistance is expensive. Therefore, the coil spring as a product may also be expensive.

Furthermore, in the publication No. 226523, compressive residual stress in the vicinity of the wire material surface (hereinafter referred to as "surface") of coil spring is about 1400 MPa, the compressive residual stress is sufficient for reducing cracking at the surface as a coil spring which is used under heavy load stress of valve spring or clutch damper spring class. However, as a result of improving compressive residual stress at the surface, compressive residual stress inside of the wire material is decreased, and the effect of the compressive residual stress against generating of cracking which starts from inclusions or the like inside of wire material, is poor. That is, since there is a limitation in energy imparted by shotpeening in the method of the publication No. 226523, it is difficult to greatly increase total sum of compressive residual stress although distribution of compressive residual stress can be changed so some extent. It is not considered to solve influence by the abovementioned residual stress by processing, therefore, effect of improving fatigue resistance for a wire material having same strength is poor.

It should be noted that kinds of means for improving surface compressive residual stress are practically realized, and as a result, in a coil spring having wire diameter of about 1.5 to 10 mm for example, the maximal value of synthesis stress which is a sum of action stress by outer load and residual stress exists in a range of 0.1 to 0.4 mm of depth from the wire material surface (hereinafter referred to as "depth"), and the part having the largest synthesis stress corresponds to an origin of breakage. Therefore, it is important for the fatigue resistance to maintain large compressive residual stress in a depth range of 0.1 to 0.4 mm.

SUMMARY OF THE INVENTION

As mentioned above, conventional methods for production such as one shown in the above patent and publication do not satisfy the recent requirement for both further improvement in fatigue resistance under high stress and cost reduction. Furthermore, the oil tempered wire which is currently mainly used for a cold forming is expensive, and in particular, the oil tempered wire in which expensive element such as Ni, V, or Mo is added to improve performance is very expensive. Furthermore, since residual stress by processing is not completely solved by an annealing treatment after forming, performance of the wire material is not sufficiently utilized.

In view of the above circumstances, an object of the present invention is to provide a compression coil spring having high durability in which inexpensive wire material is used, by solving tensile residual stress due to coiling processing and by forming C-condensed layer at the surface of wire material so as to impart appropriate compressive residual stress distribution on the wire material after forming, and a method for production thereof.

As a result of the inventors have researched fatigue resistance of coil spring, they found that in order to obtain large compressive residual stress in the depth range of 0.1 to 0.4 mm, it is important to solve tensile residual stress during coiling processing so as to effectively obtain effect of shotpeening and setting performed thereafter. Then, they researched method for solving tensile residual stress of spring wire material before shotpeening process. As a result, they focused on a fact that residual stress can be solved by heating coil spring wire material to an austenite region, and they found that coiling processing is performed in a condition in which coil spring wire material is heated to an austenite region and generation of residual stress due to processing is solved, so that effect of shotpeening and setting performed thereafter can be effectively obtained.

At the heating step to the austenite region, to perform the heating in short time may result in reducing coarsening of prior austenite crystal particle diameter (hereinafter referred to as "crystal particle diameter") or result in miniaturization. This crystal particle diameter has a close relationship with fatigue resistance, and the miniaturization of the crystal particle diameter is effective for improving fatigue resistance. Therefore, by performing hot processing in which coil spring wire material is heated in a short time, together with an effect to solve residual stress due to processing, a spring having superior fatigue resistance can be produced.

Furthermore, by performing carburizing to coil spring and by forming C-condensed layer on the surface, hardness in the vicinity of the surface can be made higher, yield stress can be improved, and effect of shotpeening performed thereafter can be efficiently obtained. Here, if the carburizing treatment is performed during hot coiling processing, the carburizing treatment can be efficiently performed.

Furthermore, after the cold coiling processing, the coil spring wire material is heated up to the austenite region so as to resolve residual stress by processing, so that effect by shotpeening and setting performed thereafter can be efficiently obtained. In the case of the cold coiling processing, carburizing treatment can be efficiently performed if the carburizing treatment is simultaneously performed when heating after coiling.

That is, the compression coil spring of the present invention includes a steel wire material containing 0.45 to 0.80 weight % of C, 0.15 to 2.50 weight % of Si, 0.3 to 1.0 weight % of Mn and iron and inevitable impurities as the remainder, and having a circle equivalent diameter of 2.5 mm to 10 mm, in which internal hardness at a freely selected cross section of the wire material is in a range of 570 to 700 Hv, C-condensed layer which exceeds average concentration of C contained in the steel wire material exists at surface layer part, and in an approximate maximum principal stress direction generated when a compressive load is loaded on spring of inner diameter side of the coil spring of the wire material, unloaded compressive residual stress at a depth of 0.2 mm and 0.4 mm from surface of the wire material is not less than 200 MPa and not less than 60 MPa, respectively. Here, the "approximate maximum principal stress direction generated when a compressive load is loaded on spring" means approximately +45° degree to axial direction of the wire material. This maximum principal stress direction varies depending on shape of a coil spring (in particular, relationship with pitch angle), and the direction is in a range of +45° to +60° to the axial direction.

Furthermore, the compression coil spring of the present invention includes a steel wire material containing 0.45 to 0.80 weight % of C, 0.15 to 2.50 weight % of Si, 0.3 to 1.0 weight % of Mn and iron and inevitable impurities as the remainder, and having a circle equivalent diameter of 2.5 mm to 10 mm, in which internal hardness at a freely selected cross section of the wire material is in a range of 570 to 700 Hv, C-condensed layer which exceeds average concentration of C contained in the steel wire material exists at surface layer part, and $I_{-oR}$ is not less than 160 MPa·mm at inner diameter side of the coil spring of the wire material. Here, the "$I_{-oR}$" means value of integral from surface to a crossing point in a residual stress distribution curve having vertical axis of residual stress and horizontal axis of wire radius, when defining a depth from surface of the wire material at which value of unloaded compressive residual stress is zero as the crossing point, in an approximate maximum principal stress direction generated when a compressive load is loaded on the spring. The larger crossing point suggests that the compressive residual stress goes deeper from the surface.

Furthermore, the compression coil spring of the present invention includes a steel wire material containing 0.45 to 0.80 weight % of C, 0.15 to 2.50 weight % of Si, 0.3 to 1.0 weight % of Mn and iron and inevitable impurities as the remainder, and having a circle equivalent diameter of 1.5 mm to 3 mm, in which internal hardness at a freely selected cross section of the wire material is in a range of 570 to 700 Hv, C-condensed layer which exceeds average concentration of C contained in the steel wire material exists at surface layer part, and in an approximate maximum principal stress direction generated when a compressive load is loaded on spring of inner diameter side of the coil spring of the wire material, unloaded compressive residual stress at a depth of 0.15 mm and 0.3 mm from surface of the wire material is not less than 300 MPa and not less than 50 MPa, respectively.

Furthermore, the compression coil spring of the present invention includes a steel wire material containing 0.45 to 0.80 weight % of C, 0.15 to 2.50 weight % of Si, 0.3 to 1.0 weight % of Mn and iron and inevitable impurities as the remainder, and having a circle equivalent diameter of 1.5 mm to 3 mm, in which internal hardness at a freely selected cross section of the wire material is in a range of 570 to 700 Hv, C-condensed layer which exceeds average concentration of C contained in the steel wire material exists at surface layer part, and $I_{-oR}$ is not less than 130 MPa·mm at inner diameter side of the coil spring of the wire material.

Hereinafter reasons for limitation in the value ranges defined in the present invention are explained. First, reasons for limitation in chemical components of the steel wire material used in the present invention are explained. In the present invention, the steel wire material containing 0.45 to 0.80 weight % of C, 0.15 to 2.50 weight % of Si, 0.3 to 1.0 weight % of Mn and iron and inevitable impurities as the remainder, is used. Hereinafter, "%" means "weight %".

(1) Material Components

C: 0.45 to 0.80%

C contributes improvement in strength. In a case in which content of C is less than 0.45%, since strength is not improved enough, fatigue resistance and settling resistance may be insufficient. On the other hand, in a case in which content of C is more than 0.80%, toughness may be decreased and cracking may easily occur. Therefore, the content of C is 0.45 to 0.80%.

Si: 0.15 to 2.50%

Si is effective for deoxidizing steel, and furthermore, contributes improvement in strength and tempering softening resistance. In a case in which content of Si is less than 0.15%, these effects cannot be sufficiently obtained. On the other hand, in a case in which content of Si is more than 2.50%, toughness may be decreased and cracking may easily occur, and furthermore, decarburizing may be promoted and surface strength of wire material may be deteriorated. Therefore, the content of Si is 0.15 to 2.50%.

Mn: 0.3 to 1.0%

Mn contributes improvement in quenching property. In a case in which content of Mn is less than 0.3%, it may be difficult to maintain sufficient quenching property, and effect of fixation of S (generation of MnS) negative to ductility and toughness may be decreased. On the other hand, in a case in which content of Mn is more than 1.0%, ductility may be decreased, and cracking and surface damage may easily occur. Therefore, content of Mn is 0.3 to 1.0%.

It should be noted that these additive elements are minimum required element for configuring the present invention, and other elements can be added further. That is, in the present invention, it is possible to add 0.005 to 4.5% of at least one or more element selected from Cr, B, Ni, Ti, Cu, Nb, V, Mo, W and the like which are generally used for component composition of spring steel depending on the purpose, and as a result, a coil spring which exhibits higher performance or which is more appropriate for the purpose can be produced. For example, a case in which Cr is added is explained as follows.

Cr: 0.5 to 2.0%

Cr prevents decarburization effectively, and contributes improvement in strength, tempering softening resistance, and fatigue resistance. Furthermore, it is also effective for improvement in settling resistance in a hot condition. Therefore, it is desirable that Cr be further added 0.5 to 2.0% in the present invention. In a case in which content of Cr is less than 0.5%, these effects cannot be obtained sufficiently. On the other hand, in a case in which content of Cr is more than 2.0%, toughness may be decreased, and cracking and surface damage may easily occur.

(2) Hardness Distribution

As a valve spring or clutch damper spring or the like which is used under heavy load stress, strength of wire material itself is also important in addition to the below mentioned compressive residual stress distribution in order to satisfy fatigue resistance and settling resistance which are required as a coil spring. That is, it is necessary that inner hardness of wire material at a freely selected cross section be in a range of 570 to 700 HV. In a case in which it is less than 570 HV, sufficient fatigue strength and settling strength cannot be obtained since the material strength is low. In a case in which it is more than 700 HV, due to increasing of notch sensitivity accompanied by decreasing of toughness, risk of early breakage by cracking which starts from surface damage made by friction with tools during coiling or a concave portion of surface roughness of wire material formed by shotpeening may be increased. Therefore, it is not appropriate for vehicle parts of which reliability is important.

(3) C-Condensed Layer

In order to improve yield stress by increasing hardness on the surface of wire material, the C-condensed layer is formed on the surface part of the wire material by carburizing treatment. By improving yield stress, large surface compressive residual stress can be imparted by shotpeening which is performed thereafter. Furthermore, surface roughness of the wire material can be improved. Therefore, fatigue resistance can be further improved. In the C-condensed layer, C at a concentration more than average concentration of C in the wire material is contained. Furthermore, in order to obtain these effects sufficiently, it is desirable that maximum C concentration in the C-condensed layer be 0.7 to 0.9 weight %, and that depth of the C-condensed layer formed (depth of carburizing) be 0.01 to 0.1 mm from the surface of the wire material. In a case in which the maximum C concentration of the C-condensed layer is more than 0.9 weight % or thickness of the C-condensed layer is more than 0.1 mm, since the treatment must be performed at a high temperature in order for an efficient carburizing reaction, crystal particle size may be deteriorated and fatigue resistance may be deteriorated. In addition, in the case in which the C concentration is more than 0.9 weight %, C which cannot be solid-solved in parent phase may be deposited as carbides at crystal interface and thereby deteriorating toughness. Also in this case, fatigue resistance may be easily decreased.

It is desirable that hardness of the C-condensed layer be 50 HV higher than inner hardness of the wire material. This is because the C-condensed layer at the surface of wire material having higher hardness than inner hardness may result in obtaining further higher compressive residual stress in the vicinity of the surface, and generation of fatigue cracking which starts from the vicinity of the surface (including the outermost surface) can be prevented. In a case in which the value is less than 50 HV, these effects cannot be sufficiently obtained.

(4) Residual Stress Distribution

The inventors examined fracture mechanics calculation, actual durability test and the like in relationship between action stress necessary for valve spring or clutch damper spring and various factors which can be origin of fatigue breakage (such as ductility and toughness, non-metallic inclusions, abnormal structure such as defective quenching structure, surface roughness, surface damage or the like), and reached the following conclusion with respect to compressive residual stress necessary for the vicinity of wire material surface of coil spring. It should be noted that the compressive residual stress in the present invention be in the approximate maximum principal stress direction in a case in which compressive load is loaded on a spring, that is, in direction of +45° to the axial direction of the wire material.

Compressive residual stress distribution existing from surface of wire material to inside of a spring is imparted by shotpeening and setting. As is mentioned above, in order to improve fatigue strength as a spring, it is necessary to introduce compressive residual stress larger and deeper inside in addition to increasing of compressive residual stress on the surface of the wire material. In particular, it is important to further increase compressive residual stress in a range of about 0.1 to 0.4 mm of depth which is substantially origin of breakage. As an index showing the compressive residual stress distribution inside the wire material in a case of steel wire material having circle equivalent diameter of 2.5 mm to 10 mm, in an approximate maximum principal stress direction generated when a compressive load is loaded on spring of inner diameter side of the spring, unloaded compressive residual stress at a depth of 0.2 mm is not less than 200 MPa and unloaded compressive residual stress at a depth of 0.4 mm is not less than 60 MPa. In a case of steel wire material having circle equivalent diameter of 1.5 mm to 3 mm, compressive residual stress at a depth of 0.15 mm is not less than 300 MPa and unloaded compressive residual stress at a depth of 0.3 mm is not less than 50 MPa. In a case of less than these values, it is not sufficient to prevent fatigue breakage of the inner origin.

Furthermore, regarding $I_{oR}$ which is another index indicating measurement or depth of compressive residual stress inside of the spring, unloaded $I_{oR}$ value is not less than 160 MPa·mm in an approximate maximum principal stress direction generated when a compressive load is loaded on spring of inner diameter side of the spring in a case in which steel wire material of circle equivalent diameter is in a range of 2.5 mm to 10 mm, and is not less than 130 MPa·mm in a case in which steel wire material of circular equivalent diameter is in a range of 1.5 mm to 3 mm. It is desirable that unloaded maximum compressive residual stress of the surface be not less than 900 MPa in an approximate maximum principal stress direction generated when a compressive load is loaded on spring of inner diameter side of the spring, in a case of valve spring or clutch damper spring in which heavy load stress acts. By setting the compressive residual stress distribution in this way, a compression coil spring having superior fatigue resistance can be obtained.

It is desirable that the compressive residual stress distribution in the present invention be formed by shotpeening treatment. In a case in which multi-shotpeening is performed as the shotpeening treatment, it is desirable that sphere equivalent diameter of a shot used in a latter shotpeening step be smaller than that of a shot used in a former shotpeening step. In practice, it is desirable that the multi-shotpeening treatment include a first shotpeening treatment using shots having particle diameter of 0.6 to 1.2 mm, a second shotpeening treatment using shots having particle diameter of 0.2 to 0.8 mm, and a third shotpeening treatment using shots having particle diameter of 0.02 to 0.30 mm. In this way, surface roughness increased by a former shotpeening can be reduced by a latter shotpeening.

It should be noted that the shot diameter and the number of steps in the shotpeening treatment are not limited in the above range particularly, and necessary residual stress distribution, surface roughness or the like is imparted depending on a required performance. Therefore, the shot diameter, material, the number of steps and the like are appropriately selected. Furthermore, since compressive residual stress distribution which is introduced is also varied depending on shot rate or shot time, and these are also appropriately set depending on requirement.

(5) Coil Spring Shape

The present invention is desirable for a compression coil spring in which degree of processing in coiling is large, and high fatigue resistance is required, having following specifications. The present invention can be employed in a generally cold-formed compression coil spring in which circle equivalent diameter (diameter of a circle in a case in which cross sectional area of a wire is converted into a circle having cross sectional area as same as the cross sectional area, and including non-circular shape cross section such as polygonal shape or egg shape) of wire material is in a range of 1.5 to 10 mm, and spring index is in a range of 3 to 20.

In particular, the invention is desirable for a compression coil spring in which degree of processing in coiling is large (that is, in cold forming, tensile residual stress at inner diameter side of coil generated by coiling processing is large), and circle equivalent diameter which is for use for valve spring or clutch damper spring requiring high fatigue resistance is in a range of 1.5 to 9.0 mm and spring index in a range of 3 to 8.

Furthermore, the compression coil spring of the present invention can be obtained by hot forming method or cold forming method. In the case in which the hot forming method is employed, since the following coil spring forming apparatus is used as is different from a conventional hot forming method, a core metal is not necessary in coiling processing. Therefore, degree of freedom of possible spring shape is high. That is, as a coil spring shape formed in the present invention, in addition to a typical cylindrical shape in which coil outer diameter is almost same along spring as a whole, other irregular shapes such as conical shape, bell shape, drum shape, barrel shape and the like are possible.

(6) Crystal Particle Diameter

A method for measuring particle size is defined by Japanese Industrial Standard G0551, and it is desirable that prior austenite average grain size number G be not less than 10 in order to improve fatigue resistance. In this case, since the prior austenite crystal particle is fine and therefore transfer of sliding can be prevented in a stress concentrated part of top of fatigue cracking, and cracking may be prevented from promoting and a required fatigue resistance can be obtained. On the other hand, in a case in which the number is less than 10, effect for preventing cracking from promoting is low, and it is difficult to obtain sufficient fatigue resistance.

Furthermore, it is desirable that average crystal particle diameter (interface having direction angle difference of not less than 5° is defined as particle interface) which is measured by SEM/EBSD (electron back scatter diffraction) method be not more than 2.0 μm. In a case in which the average crystal particle diameter is more than 2.0 μm, it is difficult to obtain sufficient fatigue resistance. On the other hand, a smaller average crystal particle diameter, that is, a finer block or lath in the prior austenite particle is appropriate for improvement in fatigue resistance since resistance against cracking promoting is high.

(7) Surface Roughness

As a valve spring or clutch damper spring used under heavy load stress, in order to satisfy a required fatigue resistance, surface roughness is also important in addition to the above compressive residual stress distribution. As a result of fracture mechanics calculation and experiment for examining thereof by the inventors, it is obvious that influence of generating and promoting of cracking by surface origin can be rendered harmless by setting depth of surface damage (that is, surface roughness Rz (maximum height)) not more than 20 μm. Therefore, it is desirable that the surface roughness Rz is not more than 20 μm. In a case in which Rz is more than 20 μm, a concave part of the surface may become stress concentrated part, and cracking which starts from the concave part may easily generate and promote, thereby resulting in early breakage.

Hereinafter the method for production of compression coil spring of the present invention is explained. In the first method for production of compression coil spring of the present invention, a coiling process in which steel wire material is hot-formed by a coil spring forming apparatus, a quenching process in which the coil which is coiled and cut off and is still at an austenite temperature range is quenched as it is, a tempering process in which the coil is thermally refined, a shotpeening process in which compressive residual stress is imparted to the wire material surface, and a setting process are performed in this order. Here, the coil spring forming apparatus includes a feed roller continuously supplying the steel wire material, a coiling part coiling the steel wire material in a coil shape, and a cutting means for cutting the steel wire material which is continuously supplied from upstream after the steel wire material is coiled at a predetermined number of winding. The coiling part includes a wire guide for introducing the steel wire material supplied by the feed roller to an appropriate position in processing part, a coiling tool including a coiling pin or coiling roller for processing the steel wire material supplied via the wire guide into a coil shape, and a pitch tool for imparting pitch. Furthermore, the coil spring forming apparatus further includes a heating means in which the steel wire material is heated up to an austenite temperature region within 2.5 seconds between exit of the feed roller and the coiling tool. In the first method for production of the compression coil spring of the present invention, a carburizing process is performed in which hydrocarbons gas is directly sprayed to surface of the steel wire material between heating process and before quenching.

It is desirable that the heating means be a high-frequency heating, and a high-frequency heating coil be arranged so as to be coaxial with the steel wire material on a route of passing of the steel wire material in the wire guide, or on a route of passing of the steel wire material in a space between end of steel wire material exit side of the wire guide and the coiling tool. It should be noted that other heating means such as an energizing heating or a laser heating can be employed other than the high-frequency heating, as long as temperature of the steel wire material can be increased up to an austenite region in a short time.

Furthermore, in the second method for production of the compression coil spring of the present invention, a carburizing process in which the C-condensed layer is formed on the surface of the steel wire material, a coiling process in which the steel wire material is hot-formed by a coil spring forming apparatus, a quenching process in which the coil which is coiled and cut off and is still at an austenite temperature range is quenched as it is, a tempering process in which the coil is thermally refined, a shotpeening process in which compressive residual stress is imparted to the wire material surface, and a setting process are performed in this order. The means for forming the C-condensed layer in the carburizing process is a method in which hydrocarbons gas is directly sprayed to surface of the steel wire material which is heated. The coil spring forming apparatus which is used in the coiling process is as same as used in the first method for production of the compreesion coil spring of the present invention. It should be noted that the high-frequency heating is employed as the heating means, and the high-frequency heating coil is arranged so as to be coaxial with the steel wire material on a route of passing of the steel wire material in the wire guide, or on a route of passing of the steel wire material in a space between end of steel wire material exit side of the wire guide and the coiling tool. Furthermore, the carburizing process and the coiling process are continuous each other in which the steel wire material is not cut therebetween.

Furthermore, in the third method for production of compression coil spring of the present invention, a coiling process in which the steel wire material is hot-formed by a coil spring forming apparatus, a heating and quenching process in which the coil is heated up to an austenite temperature range within 20 seconds and then quenched, a tempering process in which the coil is thermally refined, a shotpeening process in which compressive residual stress is imparted to the wire material surface, and a setting process are performed in this order. Here, the heating means in the heating and quenching process is a high-frequency heating, and the carburizing process is performed in which hydrocarbons gas is directly sprayed to surface of the steel wire material between heating process and before quenching.

In the first to third methods for production of the compression coil spring of the present invention, it is desirable that surface temperature of the steel wire material when spraying the hydrocarbons gas be at 850 to 1150° C., and dynamic pressure of the hydrocarbons gas on the surface part of the steel wire material be 0.1 to 5.0 kPa. According to the carburizing conditions, carburizing can be efficiently performed in a short time while preventing significant decreasing of crystal particle size of the wire material. Furthermore, in the first to third methods for production of the compression coil spring of the present invention, it is desirable that main component of the hydrocarbons gas be methane, butane, propane, or acetylene.

In the above method for production, the tempering process is performed so that the coil which is hardened by the quenching process is thermally refined into a coil having appropriate hardness and toughness. Therefore, in a case in which required hardness and toughness are obtained in quenching process, the tempering process can be omitted. In addition, the multi-step shotpeening can be performed in the shotpeening process, and furthermore, if necessary, a low temperature aging treatment can be combined on the purpose of recovery of surface elastic limit. Here, the low temperature aging treatment can be performed after the shotpeening process, or between each of steps in the multi-step shotpeening. In a case in which a shotpeening is performed by shots having particle diameter of 0.02 to 0.30 mm as the last step of the multi-step shotpeening, it is desirable that the low temperature aging treatment be performed as a pretreatment thereof, from the viewpoint of further increasing compressive residual stress of the outermost surface. It should be noted that various methods such as cold setting, hot setting or the like can be mentioned as a setting which is performed to a coil as a treatment for preventing settling in the setting process, it is appropriately selected depending on required property.

According to the first and the second methods for production of the compression coil spring of the present invention, since the hot coiling is performed by the coil spring forming apparatus, residual stress by processing can be prevented from being generated. In addition, since temperature of the steel wire material is increased up to an austenite region within 2.5 seconds, crystal particle can be prevented from coarsening, and superior fatigue resistance can be obtained. In addition, since the carburizing treatment is performed, surface of the steel wire material can be rendered high hardness, and compressive residual stress can be effectively imparted by a shotpeening performed thereafter. In particular, in the first method for production of the compression coil spring of the present invention, since the carburizing treatment is performed using heat generated during the hot coiling, the carburizing treatment can be efficiently performed.

Furthermore, according to the third method for production of the compression coil spring of the present invention, since temperature of the coil is increased up to an austenite region within 20 seconds and then it is quenched, tensile residual stress which is generated by the cold coiling can be solved while preventing crystal particle from coarsening. Furthermore, since the carburizing treatment is performed using heat generated during the heating and quenching, the carburizing treatment can be efficiently performed. As a result, compressive residual stress can be effectively imparted by a shotpeening performed thereafter, and superior fatigue resistance can be obtained.

The present invention can be applied to carbon steel wire, hard steel wire, piano wire, spring steel wire, carbon steel oil tempered wire, chromium vanadium steel oil tempered wire, silicon chromium steel oil tempered wire, and silicon chromium vanadium steel oil tempered wire which are used as a spring. In particular, it is desirable to apply to inexpensive carbon steel wire, hard steel wire, piano wire, and spring steel wire. This is because a spring having fatigue resistance superior to a conventional cold-formed spring in which expensive oil tempered wire containing expensive element is used can be obtained, even if an inexpensive wire material is used according to the method for production of the present invention.

According to the present invention, tensile residual stress by coiling processing is solved, and at the same time, by imparting appropriate compressive residual stress distribution to a wire material after formation, a compression coil spring having high durability can be obtained using an inexpensive wire material.

EXPLANATION OF REFERENCE SYMBOLS

1: Coiling apparatus forming part, 10: feed roller, 20: coiling part, 21: wire guide, 22: coiling tool, 22a: coiling pin, 23: pitch tool, 30: cutting means, 30a: cutting blade, 30b: inner mold, 40: high frequency heating coil, 50: nozzle, 60: jig, M: steel wire material.

BEST MODE FOR CARRYING OUT THE INVENTION

Hereinafter, Embodiments of the present invention are explained in detail. FIG. 1 shows each of processes for production. FIGS. 1A to 1C are the processes for production to obtain the compression coil spring of the present invention, FIGS. 1D and 1E are conventional examples. The processes for production shown in FIGS. 1A and 1B are hot forming method by the following coiling apparatus, and the process for production shown in FIG. 1C is cold forming method by a freely selected coiling apparatus.

Figure 2:
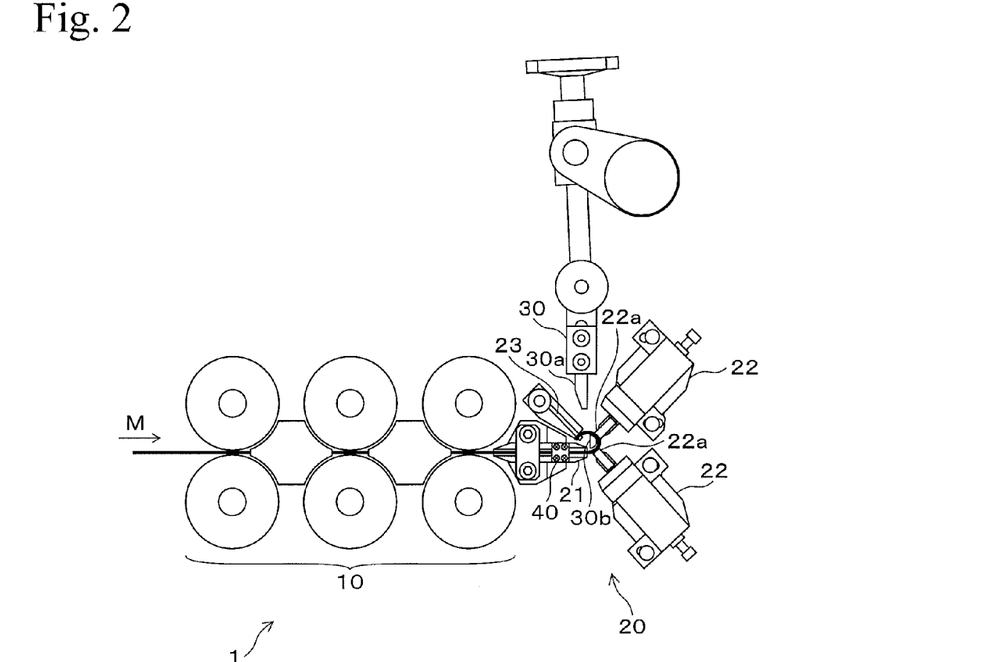
FIG. 2 is a conceptual diagram showing a forming part in the coiling apparatus in the Embodiment of the present invention.

FIG. 2 shows a conceptual diagram of the forming part of the coiling apparatus used in the processes for production shown in FIGS. 1A and 1B. As shown in FIG. 2, the coiling apparatus forming part 1 includes a feed roller 10 continuously supplying the steel wire material M, a coiling part 20 coiling the steel wire material M in a coil shape, and a cutting means 30 having a cutting blade 30a for cutting the steel wire material M which is continuously supplied from upstream after the steel wire material M is coiled at a predetermined number of winding and an inner mold 30b, and a high-frequency heating coil 40 heating the steel wire material M between exit of the feed roller 10 and a coiling tool 22. The coiling part 20 includes a wire guide 21 for introducing the steel wire material M supplied by the feed roller 10 to an appropriate position, the coiling tool 22 having a coiling pin (or a coiling roller) 22a for processing the steel wire material M supplied via the wire guide 21 into a coil shape, and a pitch tool 23 for imparting pitch.

Heating in the coiling apparatus is rapidly performed by the high-frequency heating coil 40, and the steel wire material is heated up to an austenite temperature region within 2.5 seconds. The location of arrangement of the high-frequency heating coil 40 is shown in FIG. 2. The high-frequency heating coil 40 is arranged in the vicinity of the wire guide 21, and the coiling part 20 is arranged in order that the steel wire material M can be readily formed after heating. It should be noted that the location of arrangement of the high-frequency heating coil can be a location other than shown in the present Embodiment as far as the steel wire material can be readily formed after heating.

In the coiling part 20, the steel wire material M which goes through the wire guide 21 is contacted to the coiling pin 22a and is bent at a predetermined curvature, and furthermore, is contacted to a coiling pin 22a of downstream and is bent at a predetermined curvature. Furthermore, the steel wire material M is contacted to the pitch tool 23 so as to impart a pitch to obtain required coil shape. When the wire material is wound at a predetermined number of windings, the wire material is cut by shearing between the inner mold 30b and a linear part by the cutting blade 30a of the cutting means 30, so that the steel wire material M which is supplied from upstream and the steel wire material M which is formed in the spring shape are cut off.

(1) First Embodiment

FIG. 1A shows the process for production of the first Embodiment. First, a steel wire material M containing 0.45 to 0.80 weight % of C, 0.15 to 2.50 weight % of Si, 0.3 to 1.0 weight % of Mn and iron and inevitable impurities as the remainder, and having a circle equivalent diameter of 1.5 mm to 10 mm is prepared. This steel wire material M is supplied by a wire supplying apparatus (not shown) to the feed roller 10, is heated to an austenite region within 2.5 seconds by the high-frequency heating coil, and then coiled in the coiling part 20 (coiling process).

Figure 3:
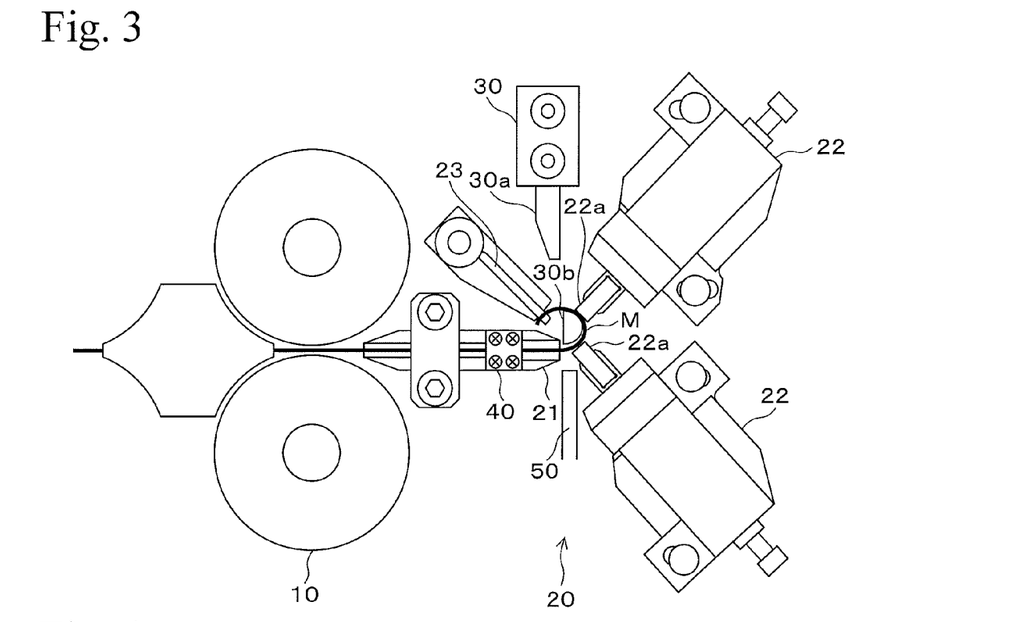
FIG. 3 is a conceptual diagram showing a location of arrangement of the high-frequency heating coil in the first Embodiment of the present invention.

In this process, hydrocarbons gas is directly sprayed to the surface of the steel wire material M between heating and before quenching so that carburization treatment is performed simultaneously (carburizing process). For example, a gas spraying nozzle 50 shown in FIG. 3 is used. Location of the nozzle can be a location other than shown in FIG. 3 as far as it is downstream of the high-frequency heating coil 40. Carburizing is performed at gas spraying pressure (dynamic pressure at the surface of the steel wire material M) of 0.1 to 5.0 kPa and at the wire material temperature of 850 to 1150° C., so that C-condensed layer having maximum concentration of C of 0.7 to 0.9 weight % and thickness of 0.01 to 0.1 mm is formed on the surface of the steel wire material. In this way, a surface part can be obtained in which hardness is 50 HV higher than that of inside of the wire material.

Next, the coil which is cut off after coiling and has still temperature at austenite region is quenched as it is in a quenching vessel (not shown) (quenching process, performed in a quenching solvent of oil at about 60° C. for example). Furthermore, tempering is performed (tempering process, performed at 150 to 450° C. for example). By quenching, a high hardness structure including martensite structure can be obtained, and furthermore, by tempering, tempered martensite structure having superior toughness can be obtained. Here, as the quenching and tempering treatments, a typical method can be employed. Heating temperature of the wire material before quenching, kind and temperature of the quenching solvent, and temperature and time of tempering are appropriately set depending on material of the steel wire material M.

Furthermore, by performing shotpeening treatment to the steel wire material M (shotpeening process) and setting treatment (setting process), a required fatigue resistance can be obtained. Since coiling is performed in a condition heated at an austenite region, generation of residual stress by processing can be prevented. Therefore, compressive residual stress can be easily imparted by shotpeening, and compressive residual stress which is deep and large from the surface at inner diameter side of the spring can be effectively imparted. Furthermore, by performing setting treatment, a further deeper compressive residual stress distribution is formed in the maximum principal stress direction when used as a spring, and fatigue resistance can be improved.

In this Embodiment, a multi-step shotpeening treatment including a first shotpeening treatment by shots having particle diameter of 0.6 to 1.2 mm, a second shotpeening treatment by shots having particle diameter of 0.2 to 0.8 mm, and a third shotpeening treatment by shots having particle diameter of 0.02 to 0.30 mm is performed. Since smaller shot is used in a latter shotpeening treatment than in a former shotpeening process, surface roughness of the wire material can be even.

As the shot used in the shotpeening, a high hardness particle such as steel cut wire, steel beads and FeCrB type can be used. Furthermore, compressive residual stress can be controlled by sphere equivalent diameter, projection rate, projection time of the shot, or projection method of multi steps.

Furthermore, in this Embodiment, hot setting is performed as the setting treatment, the wire material is heated at 100 to 300° C., and plastic strain is imparted to the steel material having a spring shape so that shear strain amount acting to the surface of the wire material is not less than shear strain amount at action stress in a case in which it is used as a practical spring.

The compression coil spring of the present invention produced by abovementioned processes has internal hardness at a freely selected cross section of the wire material in a range of 570 to 700 Hv, and C-condensed layer at the surface layer part. In a case of the steel wire material having circle equivalent diameter of 2.5 mm to 10 mm, in an approximate maximum principal stress direction generated when a compressive load is loaded on spring of inner diameter side of the spring, unloaded compressive residual stress at a depth of 0.2 mm and 0.4 mm from surface of the wire material is not less than 200 MPa and not less than 60 MPa, respectively. Furthermore, in a case of the steel wire material having circle equivalent diameter of 1.5 mm to 3 mm, compressive residual stress at a depth of 0.15 mm and 0.3 mm from surface of the wire material is not less than 300 MPa and not less than 50 MPa, respectively.

Furthermore, the compression coil spring of the present invention produced by abovementioned processes has internal hardness at a freely selected cross section of the wire material in a range of 570 to 700 Hv, and C-condensed layer at the surface layer part. In an approximate maximum principal stress direction generated when a compressive load is loaded on spring of inner diameter side of the spring, in a case of the steel wire material having circle equivalent diameter of 2.5 mm to 10 mm, the unloaded $I_{-oR}$ is not less than 160 MPa·mm, and in a case of the steel wire material having circle equivalent diameter of 1.5 mm to 3 mm, not less than 130 MPa·mm. It should be noted that the C-condensed layer has the maximum C concentration of 0.7 to 0.9 weight %, thickness of 0.01 to 0.1 mm, and hardness 50 HV or more higher than that of inside. Therefore, in the compression coil spring of the present invention, compressive residual stress is imparted deeply and largely, and fatigue resistance is superior.

(2) Second Embodiment

Figure 4:
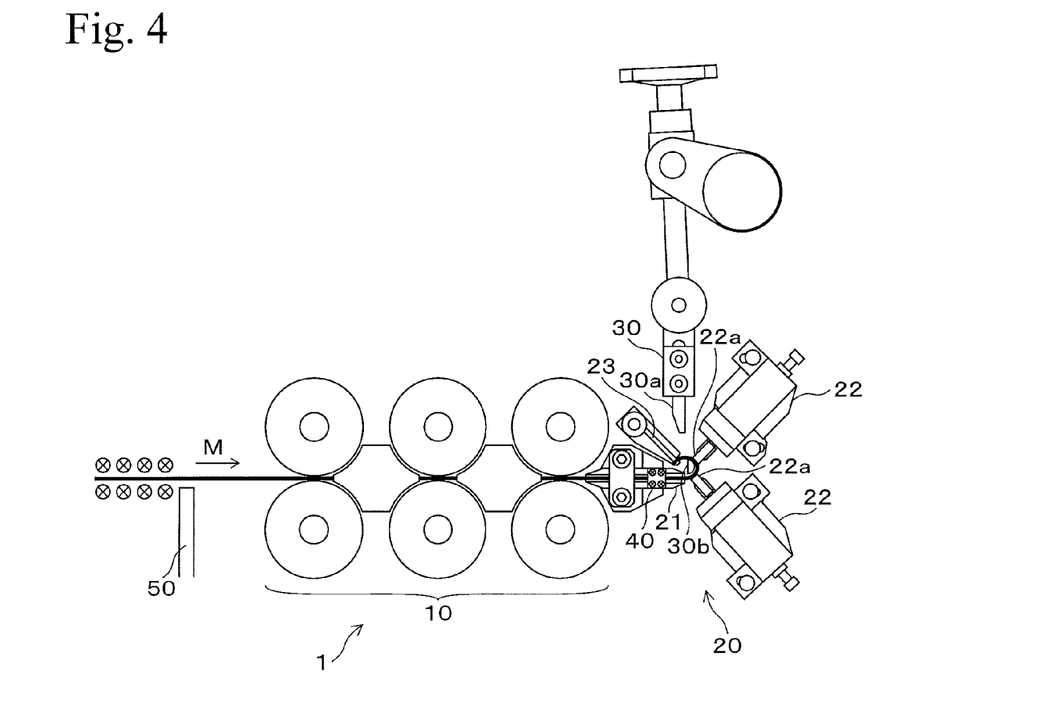
FIG. 4 is a conceptual diagram showing a location of arrangement of the high-frequency heating coil in the second Embodiment of the present invention.

The carburizing treatment is performed during hot coiling in the first Embodiment, and on the other hand, the compression coil spring of the present invention can be obtained even if carburizing process is performed before hot coiling as shown in FIG. 1B. For example, as shown in FIG. 4, the carburizing treatment is performed by arranging the gas spraying nozzle 50 upstream of the feed roller 10. Location of the nozzle can be a location other than shown in FIG. 4, as far as it is upstream of the feed roller 10. Conditions of the carburizing are as similar as in the first Embodiment. After the carburizing process, the steel wire material M is supplied to coiling process as it is without being cut. It should be noted that the coiling process, quenching process, tempering process, shotpeening process, and setting process are performed as similar as in the first Embodiment.

According to the second Embodiment, the compression coil spring similar to in the first Embodiment can be obtained. Furthermore, in the second Embodiment, since the carburizing process is performed before the coiling, time for carburizing can be set more freely than in the first Embodiment.

(3) Third Embodiment

Figure 5:
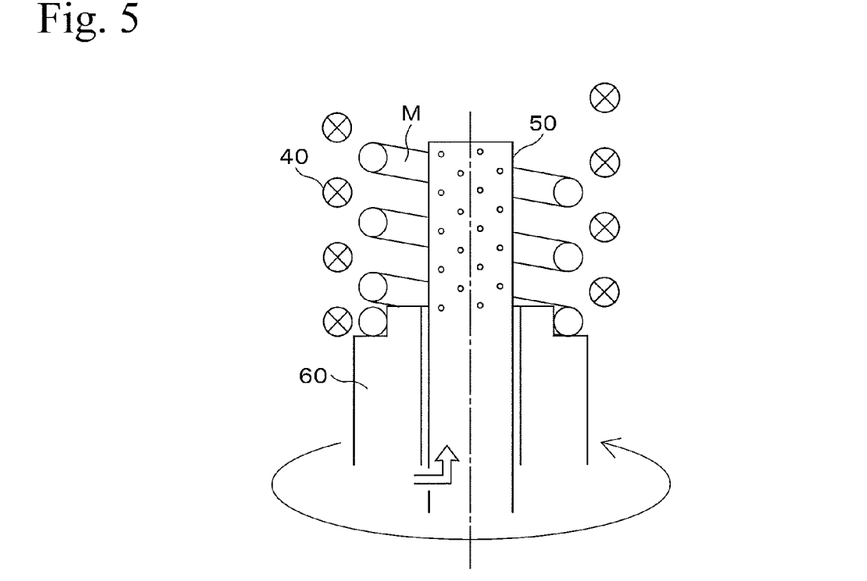
FIG. 5 is a conceptual diagram showing a location of arrangement of the high-frequency heating coil in the third Embodiment of the present invention.

Furthermore, the compression coil spring of the present invention can be obtained by a cold forming method as shown in FIG. 1C. The steel wire material M used in the first Embodiment is processed by a cold coiling by a freely selected coiling apparatus (coiling process). Then, the steel wire material M after the coiling is heated to an austenite region within 20 seconds so as to quench (heating quenching process). In this time, the heating is performed by a high-frequency heating method, and carburizing treatment is performed at the same time by directly spraying hydrocarbons gas to the surface of the steel wire material M between the heating and before quenching (carburizing process). For example, as shown in FIG. 5, the steel wire material M is fixed to a jig 60 which is rotatable, and the high-frequency heating coil 40 is arranged around the steel wire material M and a nozzle 50 having gas supplying hole is arranged inside the spring. Then, while rotating the steel wire material M by rotating the jig 60, gas is supplied through the nozzle 50, so that surface of the coil spring is uniformly quenched and carburized. Conditions of the carburizing are as similar as in the first Embodiment.

Next, quenching process, tempering process, shotpeening process, and setting process are performed in this order as similar as in the first Embodiment. Since heating is performed until an austenite region in the heating and quenching process, tensile residual stress generated by cold forming can be solved, and effect by shotpeening and setting can be effectively obtained. In this way, the compression coil spring having as similar properties as in the first Embodiment can be obtained.

Compared to the first and second Embodiments, since the high-frequency heating is performed to the steel wire material M having coil shape in the third Embodiment, it is necessary to consider soaking. In addition, since heating time is comparatively long, effect of crystal particle miniaturization is worse than in the first and second Embodiments. Furthermore, large processing strain remains in a coil spring after forming in a cold forming method, and the processing strain is not even in a spring. Therefore, in the heating and quenching process, shape of a spring may be easily warped when solving the processing strain. Furthermore, in the third Embodiment, heating coils are necessary which are designed to soak each product during heating of a coil spring having complicated shape (irregular shape such as conical shape, bell shape, drum shape, and barrel shape), and a huge amount of effort is required in order to design the heating coils and to find conditions of the heating. In addition, there may be a case in which soaking is difficult with respect to a coil spring having more complicated shape. Therefore, from any viewpoints above, the method for productions in the first and the second Embodiments are more desirable than that in the third Embodiment.

EXAMPLES

1. Method for Production of Samples

Samples of coil spring were produced by each production process, and fatigue resistance of the sample was evaluated. First, a hard-drawn wire and an oil-tempered wire having chemical compositions shown in Table 1 and iron and inevitable impurities as the remainder were prepared. The wire diameter of each wire material is shown in Table 2. Then, with respect to the hard-drawn wire or the oil-tempered wire, according to the processes for production shown in FIGS. 1A to 1E (hereinafter defined as production processes A to E), coil springs having spring index of 6, pitch angle of valid part of 9°, and number of windings of valid part of 4.25 were produced by hot forming method or cold forming method.

TABLE 1

| Symbol | C | Si | Mn | Cr | V | Ni | Mo | W | Note (wt %) |
|---|---|---|---|---|---|---|---|---|---|
| A | 0.65 | 0.23 | 0.49 | — | — | — | | | Hard-drawn wire |
| B | 0.46 | 0.26 | 0.84 | 0.91 | 0.023 | — | | | Hard-drawn wire |
| C | 0.56 | 1.44 | 0.72 | 0.74 | — | — | | | Hard-drawn wire |
| D | 0.57 | 1.47 | 0.69 | 0.70 | — | — | | | Oil tempered wire |
| E | 0.60 | 2.03 | 0.74 | 1.02 | 0.089 | 0.23 | | | Oil tempered wire |
| F | 0.77 | 2.12 | 0.70 | 1.06 | — | — | 0.16 | — | Oil tempered wire |
| G | 0.75 | 2.08 | 0.72 | 0.97 | — | — | — | 0.18 | Oil tempered wire |

In the production process A, the steel wire was heated and coiled by a coiling apparatus having a high-frequency heating coil and gas spraying nozzle (see FIG. 3), carburized in conditions shown in Table 2, and quenched by an oil at temperature of 60° C. In Table 2, the carburizing treatment temperature and the dynamic pressure indicate temperature of the surface of the steel wire and dynamic pressure of propane gas on the surface of the steel wire, respectively. Subsequently, tempering treatment was performed in conditions shown in Table 2 (Examples 1 to 23, 26 to 29, Comparative Examples 9 and 10). Furthermore, in the production process B, the coiling apparatus shown in FIG. 4 was used and carburizing treatment was performed in carburizing treatment conditions shown in Table 2, coiling was performed by heating the steel wire at 900° C., and quenching was performed by an oil at 60° C. Then, tempering treatment was performed at 350° C. (Example 24).

In the production process C, cold coiling was performed by a freely selected coiling apparatus, heating and carburizing treatment was performed in conditions shown in Table 2 by the apparatus shown in FIG. 5, quenching was performed by an oil at 60° C., and tempering treatment was performed at 350° C. (Example 25). In addition, for comparison, samples of coil spring were produced by the production processes D and E. In the production process D, after cold coiling, annealing treatment was performed at temperature shown in Table 2 (Comparative Examples 2, 3, 5, 7, 11 and 12). In the production process E, after cold coiling, annealing treatment was performed at 400° C., and then nitriding treatment was performed. A hardened layer having depth of 0.04 mm was formed on the surface of the wire material in the nitriding treatment (Comparative Examples 4, 6, 8, and 13).

Then, shotpeening treatment and setting treatment were performed with respect to each sample. In the shotpeening treatment, a first shotpeening treatment by steel round cut wire having sphere equivalent diameter of 1.0 mm, a second shotpeening treatment by steel round cut wire having sphere equivalent diameter of 0.5 mm, and a third shotpeening treatment by steel beads having sphere equivalent diameter of 0.1 mm were performed in this order. The setting was hot setting, which was performed at heating temperature of the coil spring at 200° C., and load stress of 1500 MPa.

TABLE 2

| Sample | Material | Wire diameter (mm) | Production process | Carburizing treatment conditions Temperature (°C.) | $C_3H_8$ Dynamic pressure (kPa) | Tempering temperature (°C.) | Annealing temperature (°C.) |
|---|---|---|---|---|---|---|---|
| Example 1 | A | 4.0 | A | 1000 | 3.0 | 400 | — |
| Example 2 | B | 4.0 | A | 1000 | 3.0 | 150 | — |
| Comparative Example 1 | C | 1.2 | A | 1000 | 3.0 | 350 | — |
| Example 3 | C | 1.5 | A | 1000 | 3.0 | 350 | — |
| Comparative Example 2 | C | 1.5 | D | — | — | — | 350 |
| Comparative Example 3 | D | 1.5 | D | — | — | — | 350 |
| Comparative Example 4 | E | 1.5 | E | — | — | — | 400 |
| Example 4 | C | 2.0 | A | 1000 | 3.0 | 350 | — |
| Example 5 | C | 2.5 | A | 1000 | 3.0 | 350 | — |
| Comparative Example 5 | D | 2.5 | D | — | — | — | 350 |
| Comparative Example 6 | E | 2.5 | E | — | — | — | 400 |
| Example 6 | C | 3.0 | A | 1000 | 3.0 | 350 | — |
| Comparative Example 7 | D | 3.0 | D | — | — | — | 350 |
| Comparative Example 8 | E | 3.0 | E | — | — | — | 400 |
| Comparative Example 9 | C | 4.0 | A | 800 | 3.0 | 350 | — |
| Example 7 | C | 4.0 | A | 850 | 3.0 | 350 | — |
| Example 8 | C | 4.0 | A | 950 | 3.0 | 350 | — |
| Example 9 | C | 4.0 | A | 1000 | 0.5 | 350 | — |
| Example 10 | C | 4.0 | A | 1000 | 1.0 | 350 | — |
| Example 11 | C | 4.0 | A | 1000 | 2.0 | 350 | — |
| Example 12 | C | 4.0 | A | 1000 | 3.0 | 350 | — |
| Example 13 | C | 4.0 | A | 1000 | 3.0 | 300 | — |
| Example 14 | C | 4.0 | A | 1000 | 3.0 | 250 | — |
| Example 15 | C | 4.0 | A | 1000 | 3.0 | 400 | — |
| Example 16 | C | 4.0 | A | 1000 | 4.0 | 350 | — |
| Example 17 | C | 4.0 | A | 1000 | 5.0 | 350 | — |
| Example 18 | C | 4.0 | A | 1050 | 3.0 | 350 | — |
| Example 19 | C | 4.0 | A | 1150 | 3.0 | 350 | — |
| Comparative Example 10 | C | 4.0 | A | 1000 | 3.0 | 435 | — |
| Example 20 | C | 8.0 | A | 1000 | 3.0 | 350 | — |
| Example 21 | C | 9.0 | A | 1000 | 3.0 | 350 | — |
| Example 22 | C | 10.0 | A | 1000 | 3.0 | 350 | — |
| Example 23 | C | 10.0 | A | 1000 | 3.0 | 400 | — |
| Example 24 | C | 4.0 | B | 1000 | 3.0 | 350 | — |
| Example 25 | C | 4.0 | C | 1000 | 3.0 | 350 | — |
| Comparative Example 11 | D | 4.0 | D | — | — | — | 400 |
| Example 26 | D | 4.0 | A | 1000 | 3.0 | 350 | — |
| Example 27 | E | 4.0 | A | 1000 | 3.0 | 435 | — |
| Example 28 | F | 4.0 | A | 1000 | 3.0 | 435 | — |
| Example 29 | G | 4.0 | A | 1000 | 3.0 | 435 | — |
| Comparative Example 12 | E | 4.0 | D | — | — | — | 435 |
| Comparative Example 13 | E | 4.0 | E | — | — | — | 400 |

2. Method for Evaluation

Properties of these samples produced as mentioned above were examined as follows. The results are shown in Table 3. It should be noted that in Comparative Example 1, although coiling was possible, predetermined spring shape could not be formed since the wire material was buckled during coiling, and therefore, it was not evaluated.

(1) Hardness (HV)

Measurement was performed at inner diameter side of a coil in a cross section of wire material of the coil spring using a Vickers hardness testing apparatus (trade name: FM-600, produced by Future Tech Corp.). The measured load was 10 gf from the surface to a depth of 0.05 mm, 25 gf from a depth of 0.05 to 0.1 mm, and 200 gf at a depth not less than 0.2 mm. (2) Compressive residual stress at a depth of 0.15, 0.2, 0.3, and 0.4 mm ($-\sigma_{R0.15}$, $-\sigma_{R0.2}$, $-\sigma_{R0.3}$, and $-\sigma_{R0.4}$), Maximum compressive residual stress ($-\sigma_{Rmax}$), Value of integral of compressive residual stress ($I_{-\sigma R}$), and Crossing point (CP)

Figure 6:
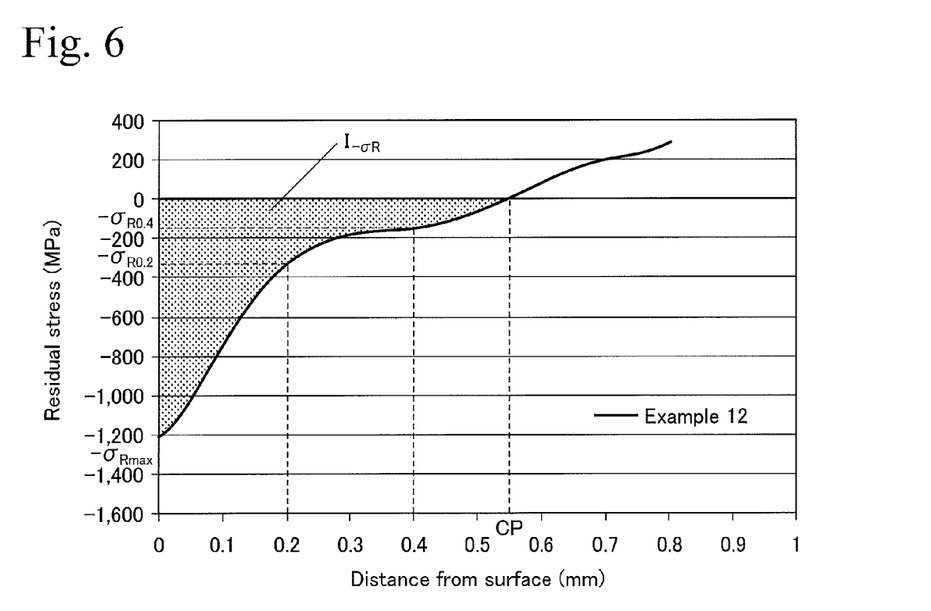
FIG. 6 is a graph showing the residual stress distribution of the coil spring used in Example.

At surface of inner diameter side of the coil spring, compressive residual stress of +45° direction with respect to wire axis direction of the wire material (an approximate maximum principal stress direction when a compressive load is loaded on spring) was measured using an X-ray diffraction type residual stress measuring apparatus (produced by Rigaku Corporation). The measurement was performed in conditions of tube: Cr, and collimator diameter: 0.5 mm. Furthermore, chemical polishing was performed on the entire surface of the wire material of the coil spring using hydrochloric acid, and then the measurement was performed. These processes were repeated so as to measure residual stress distribution along the depth direction, and according to the results, unloaded compressive residual stress at a depth of 0.15, 0.2, 0.3, and 0.4 mm, maximum compressive residual stress, and crossing point (CP) were measured. Furthermore, value of integral of compressive residual stress was calculated by integrating compressive residual stress from the surface to the crossing point, in a diagram showing relationship of depth and residual stress. It should be noted that residual stress distribution of Example 12 is shown in FIG. 6.

(3) Surface C Concentration (CC), and C-Condensed Layer Thickness (Ct)

At the inner diameter side of cross section of wire material of the coil spring, C concentration of the surface and thickness of the C-condensed layer were measured. In the measurement, a line analysis was performed in conditions of beam diameter 1 μm and measuring pitch 1 μm using EPMA (trade name: EPMA-1600, produced by Shimadzu Corporation). The thickness of the C-condensed layer is defined as a depth from the surface at which C concentration is as same as that inside of the wire material. It should be noted that the C-condensed layer was not formed in Comparative Example 9, these values are not in Table 3.

(4) Prior Austenite Average Grain Size Number (G)

As a preliminary treatment, samples of coil spring were heated for 1 hour at 500° C. Then, at a one-quarter depth of cross section of the coil spring (d/4), the prior austenite average grain size number G was calculated in conditions of number of sights 10 and magnification 1000 times using an optical microscope (trade name ME600, produced by NIKON) according to Japanese Industrial Standard (JIS) G0551.

(5) Surface Roughness (Rz (Maximum Height))

The surface roughness was measured using a non-contact three dimensional shape measuring apparatus (trade name: NH-3, produced by MITAKA) according to JIS B0601. Conditions of the measurement were measuring magnification 100 times, measuring distance 4 mm, measuring pitch 0.002 mm, and cut-off value 0.8 mm.

(6) Average Crystal Particle Diameter (dGS)

The average crystal particle diameter was measured using JEOL JSM-7000F (OIM-Analysis Ver. 4.6, produced by TSL Solutions) according to FE-SEM/EBSD (electron back scatter diffraction) method. Here, the measurement was performed at the one-quarter depth of cross section of the coil spring (d/4) and in condition of observing magnification 10000 times, and a interface at which direction angle difference is 5° or more is defined as particle interface so as to calculate average crystal particle diameter.

(7) Fatigue Resistance (Breakage Ratio)

The fatigue test was performed in the atmosphere at room temperature using a hydraulic servo type fatigue resistance testing apparatus (produced by Saginomiya Seisakusho, Inc.). The fatigue resistance was evaluated according to damaged ratio (number of breakage/number of test) when vibrated 20 million times in conditions of testing stress 735±662 MPa, frequency 20 Hz, and number of test 8 pieces in each sample.

TABLE 3

| Sample | HV Inside | HV Surface | $-S_{R0.15}$ (MPa) | $-S_{R0.2}$ (MPa) | $-S_{R0.3}$ (MPa) | $-S_{R0.4}$ (MPa) | $-S_{Rmax}$ (MPa) | $I_{sR}$ (MPa·mm) | CP (mm) | $C_c$ (%) | $C_t$ (μm) | G | Rz (μm) | $d_{GS}$ (μm) | Damaged ratio |
|---|---|---|---|---|---|---|---|---|---|---|---|---|---|---|---|
| Example 1 | 604 | 656 | — | 356 | — | 244 | 1033 | 186 | 0.55 | 0.85 | 63 | 10.5 | 8.70 | 0.95 | 0/8 |
| Example 2 | 691 | 810 | — | 275 | — | 196 | 1169 | 194 | 0.51 | 0.75 | 34 | 11.8 | 6.47 | 0.95 | 0/8 |
| Example 3 | 670 | 758 | 349 | — | 79 | — | 1228 | 133 | 0.38 | 0.80 | 61 | 11.5 | 6.34 | 0.77 | 0/8 |
| Comparative Example 2 | 591 | 600 | 188 | — | −23 | — | 901 | 89 | 0.30 | — | — | 9.7 | 8.44 | 0.91 | 8/8 |
| Comparative Example 3 | 605 | 937 | 172 | — | −5 | — | 900 | 89 | 0.30 | — | — | 9.3 | 8.34 | 0.89 | 8/8 |
| Comparative Example 4 | 587 | 586 | 170 | — | −67 | — | 1309 | 88 | 0.24 | — | — | 12.3 | 5.99 | 0.72 | 5/8 |
| Example 4 | 647 | 720 | 398 | — | 61 | — | 1199 | 138 | 0.41 | 0.75 | 57 | 11.8 | 6.11 | 0.80 | 0/8 |
| Example 5 | 648 | 734 | 477 | 322 | 156 | 69 | 1210 | 160 | 0.43 | 0.75 | 55 | 12.1 | 6.11 | 0.91 | 0/8 |
| Comparative Example 5 | 592 | 589 | 291 | 86 | −30 | −75 | 923 | 100 | 0.30 | — | — | 9.5 | 8.24 | 0.82 | 8/8 |
| Comparative Example 6 | 604 | 941 | 311 | 140 | −71 | −96 | 1263 | 101 | 0.24 | — | — | 11.9 | 6.13 | 0.73 | 4/8 |
| Example 6 | 650 | 733 | 502 | 355 | 179 | 86 | 1170 | 166 | 0.48 | 0.80 | 56 | 12.1 | 6.41 | 0.94 | 0/8 |
| Comparative Example 7 | 596 | 590 | 475 | 223 | −40 | −135 | 993 | 120 | 0.29 | — | — | 9.7 | 8.51 | 0.85 | 8/8 |
| Comparative Example 8 | 613 | 935 | 437 | 247 | −64 | −133 | 1368 | 122 | 0.28 | — | — | 12.0 | 5.60 | 0.76 | 5/8 |
| Comparative Example 9 | 650 | 650 | — | 265 | — | 166 | 959 | 176 | 0.46 | — | — | 13.1 | 7.80 | 0.99 | 2/8 |
| Example 7 | 645 | 702 | — | 260 | — | 148 | 1138 | 180 | 0.57 | 0.70 | 13 | 13.8 | 6.55 | 0.65 | 1/8 |
| Example 8 | 651 | 709 | — | 276 | — | 136 | 1156 | 180 | 0.56 | 0.75 | 31 | 12.6 | 6.48 | 0.97 | 0/8 |
| Example 9 | 648 | 696 | — | 241 | — | 155 | 1098 | 181 | 0.56 | 0.70 | 32 | 11.5 | 6.79 | 0.88 | 1/8 |
| Example 10 | 653 | 716 | — | 260 | — | 140 | 1138 | 180 | 0.55 | 0.70 | 44 | 11.8 | 7.11 | 0.81 | 0/8 |
| Example 11 | 647 | 717 | — | 265 | — | 146 | 1154 | 181 | 0.55 | 0.75 | 54 | 11.6 | 6.18 | 0.77 | 0/8 |
| Example 12 | 649 | 729 | — | 334 | — | 149 | 1209 | 184 | 0.55 | 0.80 | 58 | 12.1 | 6.24 | 0.94 | 0/8 |
| Example 13 | 685 | 767 | — | 262 | — | 197 | 1180 | 187 | 0.47 | 0.80 | 57 | 11.3 | 5.46 | 0.91 | 1/8 |
| Example 14 | 690 | 782 | — | 205 | — | 102 | 1145 | 182 | 0.48 | 0.80 | 57 | 12.1 | 5.74 | 0.87 | 1/8 |
| Example 15 | 614 | 688 | — | 321 | — | 130 | 1199 | 185 | 0.57 | 0.80 | 67 | 11.9 | 7.91 | 0.90 | 0/8 |
| Example 16 | 660 | 732 | — | 314 | — | 135 | 1214 | 185 | 0.52 | 0.85 | 61 | 12.1 | 6.34 | 0.88 | 0/8 |
| Example 17 | 655 | 754 | — | 333 | — | 119 | 1222 | 187 | 0.50 | 0.90 | 65 | 12.4 | 6.10 | 0.81 | 0/8 |
| Example 18 | 641 | 735 | — | 358 | — | 122 | 1237 | 186 | 0.53 | 0.80 | 63 | 11.1 | 5.59 | 0.65 | 0/8 |
| Example 19 | 638 | 766 | — | 377 | — | 108 | 1252 | 189 | 0.49 | 0.90 | 88 | 10.2 | 5.18 | 0.68 | 1/8 |
| Comparative Example 10 | 555 | 610 | — | 313 | — | 204 | 1081 | 179 | 0.55 | 0.75 | 64 | 11.7 | 10.86 | 0.95 | 8/8 |
| Example 20 | 659 | 742 | — | 410 | — | 199 | 1181 | 247 | 0.98 | 0.75 | 52 | 11.9 | 6.28 | 0.91 | 0/8 |
| Example 21 | 646 | 731 | — | 404 | — | 206 | 1150 | 273 | 1.11 | 0.80 | 61 | 11.6 | 5.99 | 0.87 | 0/8 |
| Example 22 | 657 | 734 | — | 492 | — | 247 | 1201 | 302 | 1.24 | 0.75 | 24 | 11.6 | 8.21 | 0.94 | 0/8 |
| Example 23 | 606 | 707 | — | 464 | — | 241 | 1179 | 251 | 0.73 | 0.70 | 68 | 11.4 | 6.77 | 0.91 | 0/8 |
| Example 24 | 656 | 735 | — | 270 | — | 186 | 1168 | 181 | 0.55 | 0.80 | 63 | 11.6 | 6.10 | 0.79 | 0/8 |
| Example 25 | 647 | 744 | — | 288 | — | 156 | 1211 | 190 | 0.52 | 0.85 | 84 | 10.1 | 4.88 | 0.95 | 0/8 |
| Comparative Example 11 | 592 | 590 | — | 307 | — | −51 | 924 | 140 | 0.30 | — | — | 9.8 | 8.72 | 0.89 | 8/8 |
| Example 26 | 649 | 730 | — | 315 | — | 217 | 1213 | 184 | 0.53 | 0.75 | 42 | 13.2 | 7.37 | 0.73 | 0/8 |
| Example 27 | 597 | 666 | — | 348 | — | 197 | 1199 | 185 | 0.55 | 0.85 | 47 | 13.9 | 7.56 | 0.72 | 0/8 |
| Example 28 | 630 | 722 | — | 293 | — | 147 | 1244 | 181 | 0.54 | 0.90 | 49 | 14.5 | 6.86 | 0.77 | 0/8 |
| Example 29 | 628 | 737 | — | 286 | — | 155 | 1311 | 183 | 0.52 | 0.90 | 51 | 14.4 | 5.99 | 0.71 | 0/8 |

TABLE 3-continued

| Sample | HV Inside | HV Surface | $-S_{R0.15}$ (MPa) | $-S_{R0.2}$ (MPa) | $-S_{R0.3}$ (MPa) | $-S_{R0.4}$ (MPa) | $-S_{Rmax}$ (MPa) | $I_{sR}$ (MPa·mm) | CP (mm) | $C_c$ (%) | $C_t$ (μm) | G | Rz (μm) | $d_{GS}$ (μm) | Damaged ratio |
|---|---|---|---|---|---|---|---|---|---|---|---|---|---|---|---|
| Comparative Example 12 | 587 | 603 | — | 307 | — | −51 | 930 | 140 | 0.35 | — | — | 12.4 | 8.66 | 0.92 | 5/8 |
| Comparative Example 13 | 608 | 940 | — | 322 | — | −126 | 1520 | 147 | 0.28 | — | — | 12.1 | 5.90 | 0.79 | 2/8 |

3. Results of the Evaluation
(1) Hardness

As is obvious from Table 3, high fatigue resistance can be exhibited in the case in which inner hardness is in a range of 570 to 700 HV in the present invention. Furthermore, it is more desirable in a range of 570 to 690 HV. In the case in which hardness is in the range, compressive residual stress can be sufficiently obtained at a depth of 0.1 to 0.4 mm which may be an origin of breakage. Therefore, it is considered that the inner origin is prevented from being broken, and high fatigue resistance is obtained. Furthermore, from the results of Comparative Example 10, proof stress is small and sufficient fatigue resistance cannot be obtained in the case in which hardness is less than 570 HV, even in a coil spring produced by hot forming method. Therefore, in the present invention, the hardness is desirably in a range of 570 to 700 HV, and more desirably in a range of 570 to 690 HV.

In addition, In Examples of the invention, hardness at the surface is not less than 50 HV higher than inner hardness by carburizing treatment. In this way, high compressive residual stress can be obtained in the vicinity of the surface, and fatigue crack which starts from the vicinity of the surface including the outermost surface can be prevented from generating. As a result, fatigue resistance can be improved.

(2) Residual Stress Distribution

Example 12 in which wire material having similar compositions was used and which was produced by the production process A, Example 24 which was produced by the production process B, and Example 25 which was produced by the production process C have a larger compressive residual stress ($-\sigma_{R0.4}$) at a location deep from the surface, compared to Comparative Example 12 in which annealing treatment was performed and which was produced by the production process D. This is because in Examples which were produced by the production process A or B, almost no tensile residual stress occurred in a hot coiling, which occurred in a cold coiling (remaining at inner diameter side of coil). Furthermore, this is because in Example 25 which was produced by the production process C, tensile residual stress which occurred in the cold coiling may be completely solved by heating to an austenite region performed thereafter. That is, compared to Comparative Example 12 in which tensile residual stress by a cold coiling remained, compressive residual stress easily enters deep from the surface by shotpeening in Examples 12, 24 and 25. Therefore, since compressive residual stress at a depth of 0.1 to 0.4 mm which easily becomes origin of breakage is large, and fatigue resistance can be improved.

With respect to all of Examples 1 to 29, large maximum compressive residual stress ($-\sigma_{Rmax}$), not less than 900 MPa, was obtained. This is considered that compressive residual stress by shotpeening is improved due to improvement in yield stress in the vicinity of the surface by carburizing. In addition, $I_{oR}$ is not less than 160 MPa·mm and CP is not less than 0.43 mm in the case in which the wire diameter is in a range of 2.5 mm to 10 mm, and $I_{oR}$ is not less than 130 MPa·mm and CP is not less than 0.38 mm in the case in which the wire diameter is in a range of 1.5 mm to 3 mm, thus, deep and large compressive residual stress and superior fatigue resistance are obtained. It should be noted that as a result of observing broken surface of broken samples in Comparative Examples 2 to 5, the origin of breakage was in a range of 0.15 to 0.35 mm deep from the surface, and was an inner origin which starts from non-metallic type inclusions. This depth corresponds to the vicinity of region at which the maximum value of synthesis stress (action stress–residual stress) exhibits, and a larger compressive residual stress in the region is important for fatigue resistance. Therefore, in Example 3 in which $-\sigma_{R0.15}$ was not less than 300 MPa and $-\sigma_{R0.3}$ was not less than 50 MPa, higher fatigue resistance could be obtained compared to Comparative Example 3 in which expensive wire material is used and nitriding treatment was performed. Furthermore, in Examples 1, 2, 7 to 19, 24, 25 in which $-\sigma_{R0.2}$ was not less than 200 MPa and $-\sigma_{R0.4}$ was not less than 60 MPa, higher fatigue resistance could be obtained compared to Comparative Example 13 in which expensive wire material was used and nitriding treatment was performed.

(3) Surface C Concentration and Thickness of C-Condensed Layer

Compared to Comparative Examples 9 and 10, since carburizing was performed in Examples 7 to 19 so that the surface C concentration was 0.7 to 0.9 weight % and the thickness of the C-condensed layer was not less than 10 μm, and therefore hardness in the vicinity of the surface was high, high compressive residual stress was obtained in the vicinity of the surface and high fatigue resistance was obtained since surface roughness was improved.

(4) Prior Austenite Average Grain Size

In Examples 1, 2, 12 and 26 in which material of simple composition A, B, C or D was used and which is produced by the production process A, the G is not less than 10, and fine crystal particle was obtained almost similar to that of Comparative Examples 12 and 13 in which material E of expensive steel containing large amount of V having effect of miniaturization of crystal particle was used. The reason that such fine crystal particle could be obtained by using material of simple compositions is rapid heating by high-frequency heating. That is, by heating in a short time by high-frequency heating, effect of reducing coarsening prior austenite particle or effect of miniaturization could be obtained. Therefore, fine crystal particle and superior fatigue resistance could be obtained in Examples 1, 2, 12, and 26 having simple compositions.

As a result of performing a short-time heating by high frequency heating as similar also in Example 25 which was produced by the production process C, the G was 10.1, corresponding to fine crystal particle. The reason that crystal particle size was slightly deteriorated in the production process C compared to Example 12 of the production process A is that material having coil shape was heated by high-frequency in the production process C and thereby requiring longer heating time so as to heat uniformly, compared to the case of the production process A in which liner wire material was heated. Therefore, depending on wire diameter or shape of a coil spring, the production process A is more desirable than the production process C from the viewpoint of miniaturization of crystal particle.

(5) Surface Roughness

With respect to Examples 1 to 29 in which high fatigue resistance was obtained, the surface roughness Rz (maximum height) was not more than 9.0 μm, which sufficiently satisfies the desirable surface roughness Rz, not more than 20 μm. This surface roughness is formed by friction with respect to tools during coiling or shotpeening treatment. The surface roughness formed by shotpeening is determined by a combination of hardness of the wire material and conditions such as particle diameter, hardness and projection rate of shot. Therefore, the conditions of shotpeening should be appropriately set so that Rz is not more than 20 μm.

In Examples 7 to 19, the surface roughness was smaller than Comparative Example 9 having similar inner hardness. This is because C-condensed layer having high hardness was formed on the surface. It is considered that superior surface roughness was obtained since the surface was hard and the surface roughness was difficult to be decreased during shotpeening process. Therefore, improvement in surface roughness by forming C-condensed layer may result in reducing generation of concave part of the surface which may easily be origin of breakage, and it is effective in improvement in fatigue resistance (improvement in reliability)

(6) Average Crystal Particle Diameter

In Examples 1, 2, 12 and 26 in which material of simple composition A, B, C or D was used, dGS was in a range of 0.73 to 0.95 almost similar average crystal particle diameter in Comparative Examples 12 and 13 in which expensive steel material E was used. This is because high frequency heating in short time results in reducing coarsening of structure or results in miniaturization as mentioned above, and as a result, fine average crystal particle diameter was obtained and fatigue resistance was improved in Examples 1, 2, 12 and 26.

As a result of a short-time heating by high frequency heating similarly in Example 25 which was produced by the production process C, fine crystal particle of dGS 0.95 μm could be obtained. However, as mentioned above, since heating was performed longer in the production process C than in the production process A, the production process A is more desirable than the production process C depending on wire diameter or shape of the coil spring from the viewpoint of crystal particle miniaturization.

(7) Wire Diameter

In Examples 3 to 6, 12, 20 to 22 in which the wire diameter was varied in a arrange of 1.5 to 10 mm, an irregular deformation or the like was not observed during hot forming in the production process A, and approximately circular coil spring could be produced. In Comparative Example 1 in which the wire diameter was 1.2 mm, the wire material was buckled during coiling and fell off the coiling tool, and coil could not be produced. It should be noted that in Example 22 in which wire diameter was 10 mm, complete martensite structure could not be obtained in the vicinity of center of the wire material (practically, in a range about 2 mm from the center), and defective quenched structure was obtained. This is because since carburizing treatment was performed during coiling, time for high frequency heating was shorter, and a time for sufficient heating for soaking along radial direction of wire material could not be maintained. However, the vicinity of the center is a region at which almost no stress is applied in practical use of a coil spring, and as a result, high durability was obtained also in Example 22. From this, it is obvious that the abovementioned defective quenched structure may reach an unacceptable level in practical use as a coil spring in a case in which the wire diameter is more than 10 mm. Therefore, in the present invention, the wire diameter is desirably in a range of 1.5 to 9.0 mm.

(8) Carburizing Conditions

In order to perform carburizing reaction on the surface of wire material efficiently, gas spraying pressure not less than a certain level (dynamic pressure on the surface of the wire material) is necessary, and C-condensed layer cannot be obtained if the gas spraying pressure is too low. On the other hand, it is not desirable that carburizing reactivity may be deteriorated due to decrease of temperature of wire material surface if the gas spraying pressure is too high. In addition, the C-condensed layer was not formed in Comparative Example 9 in which temperature of wire material was 800° C. Therefore, from the viewpoint of carburizing reaction rate, it is necessary that temperature of wire material is not less than 850° C. in carburizing in short time. It should be noted that in a case in which temperature of wire material is more than 1150° C., crystal particle size may be deteriorated since the heating temperature is too high, and fatigue resistance may be easily decreased. In view of these facts, it is desirable that the gas spraying pressure be in a range of 0.1 kPa to 5.0 kPa, and temperature of wire material during the gas spraying be in a range of 850 to 1150° C. According to the conditions, surface C concentration of not less than 0.7 weight % and thickness of C-condensed layer of not less than 10 μm can be realized in each of samples as shown in Examples 7 to 19.

In view of these facts, compared to a conventional method for production of coil spring, it was confirmed that compressive residual stress which is deep and large from the surface can be obtained and fatigue resistance can be improved by solving tensile stress due to coiling and by obtaining a predetermined surface hardness by carburizing, according to the method for production of the compression coil spring of the present invention.

Difference of dimension accuracy between the production processes A and B and the production process C was evaluated by using fifty coil springs after quenching. Here, the coil springs were produced in conditions similar to those in Examples 12, 24 and 25 using wire material of C having wire diameter of 4 mm. As a result, with respect to the coil diameter, standard deviation of the coil produced by the production process C was 0.047 mm, on the other hand, standard deviation of the coil produced by the production processes A and B was 0.020 mm and 0.023 mm, respectively. In a cold forming process, a large processing strain remains in a coil spring after the cold forming, and the processing strain is not even in one spring. Therefore, it may easily be deformed unevenly (shape may become uneven, and its variation is large) when it is heated to an austenite region to solve the processing strain in quenching process. On the other hand, in a hot forming process, processing strain does not remain in a coil spring. Therefore, in a case in which high dimension accuracy is required, it is desirable to employ the production process A or B in which hot forming process is performed. In the production process C, although durability is superior, dimension accuracy is inferior to the production processes A and B since cold forming method is performed.

As explained above, according to the method for production of compression coil spring of the present invention, even if inexpensive wire material is used, a coil spring can be obtained in which fatigue resistance is superior to a conventional cold-formed spring in which expensive steel is used.

The invention claimed is:

1. A compression coil spring, comprising a steel wire material consisting of 0.45 to 0.80 weight % of C, 0.15 to 2.50 weight % of Si, 0.3 to 1.0 weight % of Mn and iron and inevitable impurities as the remainder, and having a circle equivalent diameter of 2.5 mm to 10 mm,
wherein an internal hardness at a freely selected cross section of the wire material is in a range of 570 to 700 Hv,
a C-condensed layer that exceeds an average concentration of C contained in the steel wire material exists at surface layer part, and
in an approximate maximum principal stress direction generated when the coil spring is compressed and a compressive load is loaded on an inner diameter side of the coil spring, an unloaded compressive residual stress at a depth of 0.2 mm and 0.4 mm from surface of the wire material is not less than 200 MPa and not less than 60 MPa, respectively.

2. The compression coil spring according to claim 1, wherein in an approximate maximum principal stress direction generated when the coil spring is compressed and a compressive load is loaded on an inner diameter side of the coil spring, an unloaded maximum compressive residual stress is not less than 900 MPa.

3. The compression coil spring according to claim 1, wherein an average crystal particle diameter (an interface of a direction angle difference of not less than 5° is defined as the particle interface) measured by an SEM/EBSD method is not more than 2.0 μm.

4. The compression coil spring according to claim 1, wherein a hardness of the C-condensed layer is not less than 50 HV higher than the internal hardness.

5. The compression coil spring according to claim 1, wherein a maximum C concentration in the C-condensed layer is 0.7 to 0.9 weight %, and a thickness of the C condensed layer is 0.01 to 0.1 mm.

6. The compression coil spring according to claim 1, wherein a surface roughness (maximum height) is not more than 20 μm.

7. A compression coil spring, comprising a steel wire material consisting of 0.45 to 0.80 weight % of C, 0.15 to 2.50 weight % of Si, 0.3 to 1.0 weight % of Mn and iron and inevitable impurities as the remainder, and having a circle equivalent diameter of 1.5 mm to 3 mm,
wherein an internal hardness at a freely selected cross section of the wire material is in a range of 570 to 700 Hv,
a C-condensed layer that exceeds an average concentration of C contained in the steel wire material exists at surface layer part, and
in an approximate maximum principal stress direction generated when the coil spring is compressed and a compressive load is loaded on an inner diameter side of the coil spring, an unloaded compressive residual stress at a depth of 0.15 mm and 0.3 mm from surface of the wire material is not less than 300 MPa and not less than 50 MPa, respectively.

8. The compression coil spring according to claim 7, wherein in an approximate maximum principal stress direction generated when the coil spring is compressed and a compressive load is loaded on an inner diameter side of the coil spring, an unloaded maximum compressive residual stress is not less than 900 MPa.

9. The compression coil spring according to claim 7, wherein an average crystal particle diameter (an interface of a direction angle difference of not less than 5° is defined as the particle interface) measured by a SEM/EBSD method is not more than 2.0 μm.

10. The compression coil spring according to claim 7, wherein a hardness of the C-condensed layer is not less than 50 HV higher than the internal hardness.

11. The compression coil spring according to claim 7, wherein a maximum C concentration in the C-condensed layer is 0.7 to 0.9 weight %, and a thickness of the C condensed layer is 0.01 to 0.1 mm.

12. The compression coil spring according to claim 7, wherein a surface roughness (maximum height) is not more than 20 μm.

13. A compression coil spring, comprising a steel wire material comprising 0.45 to 0.80 weight % of C, 0.15 to 2.50 weight % of Si, 0.3 to 1.0 weight % of Mn, 0.005 to 1.34 weight % of at least one of Cr, B, Ni, Ti, Cu, Nb, V, Mo, and W, and iron and inevitable impurities as the remainder, and having a circle equivalent diameter of 2.5 mm to 10 mm,
wherein an internal hardness at a freely selected cross section of the wire material is in a range of 570 to 700 Hv,
a C-condensed layer that exceeds an average concentration of C contained in the steel wire material exists at surface layer part, and
in an approximate maximum principal stress direction generated when the coil spring is compressed and a compressive load is loaded on an inner diameter side of the coil spring, when defining a depth from a surface of the wire material at which a value of an unloaded compressive residual stress is zero as a crossing point, and when defining a value of an integral from the surface to the crossing point in a residual stress distribution curve having a vertical axis of residual stress and a horizontal axis of wire radius as $I-_{oR}$, the $I-_{oR}$ is not less than 160 MPa·mm.

14. The compression coil spring according to claim 13, wherein Cr is contained 0.5 to 2.0 weight %.

15. A method for production of compression coil spring according to claim 13, comprising processes performed in the following order:
a coiling process in which steel wire material is hot-formed by a coil spring forming apparatus,
a quenching process in which a coil which is coiled and cut off and is still at an austenite temperature range is quenched as it is,
a tempering process in which the coil is thermally refined,
a shotpeening process in which compressive residual stress is imparted to wire material surface, and
a setting process, wherein
the coil spring forming apparatus comprises a feed roller continuously supplying the steel wire material, a coiling part coiling the steel wire material in a coil shape, and a cutting means for cutting the steel wire material which is continuously supplied from upstream after the steel wire material is coiled at a predetermined number of winding,
the coiling part comprises a wire guide for introducing the steel wire material supplied by the feed roller to an appropriate position in processing part, a coiling tool including a coiling pin or coiling roller for processing the steel wire material supplied via the wire guide into a coil shape, and a pitch tool for imparting pitch, the coil spring forming apparatus further comprises a heating means in which the steel wire material is heated up to an austenite temperature region within 2.5 seconds between exit of the feed roller and the coiling tool, and wherein a carburizing process is performed in which hydrocarbons gas is directly sprayed to surface of the steel wire material between heating process and before quenching.

16. The method for production of compression coil spring according to claim 15, wherein the heating means is a high-frequency heating, and a high-frequency heating coil is arranged so as to be coaxial with the steel wire material on a route of passing of the steel wire material in the wire guide, or on a route of passing of the steel wire material in a space between end of steel wire material exit side of the wire guide and the coiling tool.

17. The method for production of compression coil spring according to claim 15, wherein surface temperature of the steel wire material when spraying the hydrocarbons gas is at 850 to 1150° C., and dynamic pressure of the hydrocarbons gas on the surface part of the steel wire material is 0.1 to 5.0 kPa.

18. A method for production of compression coil spring according to claim 13, comprising processes performed in the following order:
 a carburizing process in which C-condensed layer is formed on surface of steel wire material,
 a coiling process in which the steel wire material is hot-formed by a coil spring forming apparatus,
 a quenching process in which a coil which is coiled and cut off and is still at an austenite temperature range is quenched as it is,
 a tempering process in which the coil is thermally refined,
 a shotpeening process in which compressive residual stress is imparted to wire material surface, and
 a setting process, wherein
 a means for forming the C-condensed layer in the carburizing process is a method in which hydrocarbons gas is directly sprayed to surface of the steel wire material which is heated,
 the coil spring forming apparatus which is used in the coiling process comprises a feed roller continuously supplying the steel wire material, a coiling part coiling the steel wire material in a coil shape, and a cutting means for cutting the steel wire material which is continuously supplied from upstream after the steel wire material is coiled at a predetermined number of winding,
  the coiling part comprises a wire guide for introducing the steel wire material supplied by the feed roller to an appropriate position in processing part, a coiling tool including a coiling pin or coiling roller for processing the steel wire material supplied via the wire guide into a coil shape, and a pitch tool for imparting pitch,
 the coil spring forming apparatus further comprises a heating means in which the steel wire material is heated up to an austenite temperature region within 2.5 seconds between exit of the feed roller and the coiling tool, the heating means is a high-frequency heating, and a high-frequency heating coil is arranged so as to be coaxial with the steel wire material on a route of passing of the steel wire material in the wire guide, or on a route of passing of the steel wire material in a space between end of steel wire material exit side of the wire guide and the coiling tool, and wherein the carburizing process and the coiling process are continuous each other in which the steel wire material is not cut therebetween.

19. The method for production of compression coil spring according to claim 18, wherein surface temperature of the steel wire material when spraying the hydrocarbons gas is at 850 to 1150° C., and dynamic pressure of the hydrocarbons gas on the surface part of the steel wire material is 0.1 to 5.0 kPa.

20. A method for production of compression coil spring according to claim 13, comprising processes performed in the following order:
 a coiling process in which steel wire material is hot-formed by a coil spring forming apparatus,
 a heating and quenching process in which a coil is heated up to an austenite temperature range within 20 seconds and then quenched,
 a tempering process in which the coil is thermally refined,
 a shotpeening process in which compressive residual stress is imparted to wire material surface, and
 a setting process, wherein
 a heating means in the heating and quenching process is a high-frequency heating, and wherein
 a carburizing process is performed in which hydrocarbons gas is directly sprayed to surface of the steel wire material between heating process and before quenching.

21. The method for production of compression coil spring according to claim 20, wherein surface temperature of the steel wire material when spraying the hydrocarbons gas is at 850 to 1150° C., and dynamic pressure of the hydrocarbons gas on the surface part of the steel wire material is 0.1 to 5.0 kPa.

22. The compression coil spring according to claim 13, wherein in an approximate maximum principal stress direction generated when the coil spring is compressed and a compressive load is loaded on an inner diameter side of the coil spring, an unloaded maximum compressive residual stress is not less than 900 MPa.

23. The compression coil spring according to claim 13, wherein an average crystal particle diameter (an interface of a direction angle difference of not less than 5° is defined as the particle interface) measured by an SEM/EBSD method is not more than 2.0 μm.

24. The compression coil spring according to claim 13, wherein a hardness of the C-condensed layer is not less than 50 HV higher than the internal hardness.

25. The compression coil spring according to claim 13, wherein a maximum C concentration in the C-condensed layer is 0.7 to 0.9 weight %, and a thickness of the C condensed layer is 0.01 to 0.1 mm.

26. The compression coil spring according to claim 13, wherein a surface roughness (maximum height) is not more than 20 μm.

27. A compression coil spring, comprising a steel wire material comprising 0.45 to 0.80 weight % of C, 0.15 to 2.50 weight % of Si, 0.3 to 1.0 weight % of Mn, 0.5 to 2.0 weight % of Cr, and iron and inevitable impurities as the remainder, and having a circle equivalent diameter of 2.5 mm to 10 mm,
 wherein an internal hardness at a freely selected cross section of the wire material is in a range of 570 to 700 Hv, a C-condensed layer that exceeds an average concentration of C contained in the steel wire material exists at surface layer part, and in an approximate maximum principal stress direction generated when the coil spring is compressed and a compressive load is loaded on an inner diameter side of the coil spring, when defining a depth from a surface of the wire material at which value of an unloaded compressive residual stress is zero as a crossing point, and when defining a value of an integral from the surface to the crossing point in a residual stress distribution curve having a vertical axis of residual stress and a horizontal axis of wire radius as $L_{-oz}$, the $L_{-oz}$ is not less than 160 MPa·mm.

28. The compression coil spring according to claim 27, wherein in an approximate maximum principal stress direction generated when the coil spring is compressed and a compressive load is loaded on an inner diameter side of the coil spring, an unloaded maximum compressive residual stress is not less than 900 MPa.

29. The compression coil spring according to claim 27, wherein an average crystal particle diameter (an interface of a direction angle difference of not less than 5° is defined as the particle interface) measured by a SEM/EBSD method is not more than 2.0 µm.

30. The compression coil spring according to claim 27, wherein a hardness of the C-condensed layer is not less than 50 HV higher than the internal hardness.

31. The compression coil spring according to claim 27, wherein a maximum C concentration in the C-condensed layer is 0.7 to 0.9 weight %, and thickness of the C condensed layer is 0.01 to 0.1 mm.

32. The compression coil spring according to claim 27, wherein a surface roughness maximum height) is not more than 20 µm.

33. A compression coil spring, comprising a steel wire material comprising 0.45 to 0.80 weight % of C, 0.15 to 2.50 weight % of Si, 0.3 to 1.0 weight % of Mn, 0.005 to 1.34 weight % of at least one of Cr, B, Ni, Ti, Cu, Nb, V, Mo, and W, and iron and inevitable impurities as the remainder, and having a circle equivalent diameter of 1.5 mm to 3 mm, wherein an internal hardness at a freely selected cross section of the wire material is in a range of 570 to 700 Hv, a C-condensed layer that exceeds an average concentration of C contained in the steel wire material exists at surface layer part, and in an approximate maximum principal stress direction generated when the coil spring is compressed and a compressive load is loaded on an inner diameter side of the coil spring, when defining a depth from a surface of the wire material at which a value of an unloaded compressive residual stress is zero as a crossing point, and when defining value of an integral from the surface to the crossing point in a residual stress distribution curve having a vertical axis of residual stress and a horizontal axis of wire radius as $I_{-oR}$, the $I_{-oR}$ is not less than 130 MPa·mm.

34. The compression coil spring according to claim 33, wherein in an approximate maximum principal stress direction generated when the coil spring is compressed and a compressive load is loaded on an inner diameter side of the coil spring, an unloaded maximum compressive residual stress is not less than 900 MPa.

35. The compression coil spring according to claim 33, wherein an average crystal particle diameter (an interface of a direction angle difference of not less than 5° is defined as the particle interface) measured by a SEM/EBSD method is not more than 2.0 µm.

36. The compression coil spring according to claim 33, wherein a hardness of the C-condensed layer is not less than 50 HV higher than the internal hardness.

37. The compression coil spring according to claim 33, wherein a maximum C concentration in the C-condensed layer is 0.7 to 0.9 weight %, and a thickness of the C condensed layer is 0.01 to 0.1 mm.

38. The compression coil spring according to claim 33, wherein Cr is contained 0.5 to 2.0 weight %.

39. The compression coil spring according to claim 33, wherein a surface roughness (maximum height) is not more than 20 µm.

40. A compression coil spring, comprising a steel wire material comprising 0.45 to 0.80 weight % of C, 0.15 to 2.50 weight % of Si, 0.3 to 1.0 weight % of Mn, 0.5 to 2.0 weight % of Cr, and iron and inevitable impurities as the remainder, and having a circle equivalent diameter of 1.5 mm to 3 mm, wherein an internal hardness at a freely selected cross section of the wire material is in a range of 570 to 700 Hv, a C-condensed layer that exceeds an average concentration of C contained in the steel wire material exists at surface layer part, and in an approximate maximum principal stress direction generated when the coil spring is compressed and a compressive load is loaded on an inner diameter side of the coil spring, when defining a depth from a surface of the wire material at which a value of an unloaded compressive residual stress is zero as a crossing point, and when defining a value of an integral from the surface to the crossing point in a residual stress distribution curve having a vertical axis of residual stress and a horizontal axis of wire radius as $I_{-oR}$, the $L_{-oR}$ is not less than 130 MPa·mm.

41. The compression coil spring according to claim 40, wherein in an approximate maximum principal stress direction generated when the coil spring, an unloaded maximum compressive residual stress is not less than 900 MPa.

42. The compression coil spring according to claim 40, wherein an average crystal particle diameter (an interface of a direction angle difference of not less than 5° is defined as the particle interface) measured by a SEM/EBSD method is not more than 2.0 µm.

43. The compression coil spring according to claim 40, wherein a hardness of the C-condensed layer is not less than 50 HV higher than the internal hardness.

44. The compression coil spring according to claim 40, wherein a maximum C concentration in the C-condensed layer is 0.7 to 0.9 weight %, and a thickness of the C condensed layer is 0.01 to 0.1 mm.

45. The compression coil spring according to claim 40, wherein a surface roughness (maximum height) is not more than 20 µm.

* * * * *